US010681782B2

(12) United States Patent
Chou et al.

(10) Patent No.: US 10,681,782 B2
(45) Date of Patent: Jun. 9, 2020

(54) DIMMABLE UNIVERSAL VOLTAGE LED POWER SUPPLY WITH REGENERATING POWER SOURCE CIRCUITRY AND NON-ISOLATED LOAD

(71) Applicant: Enertron, Inc., Gilbert, AZ (US)

(72) Inventors: Der Jeou Chou, Mesa, AZ (US); Ming Yi Chan, Taipei (TW)

(73) Assignee: Enertron, Inc., Gilbert, AZ (US)

( * ) Notice: Subject to any disclaimer, the term of this patent is extended or adjusted under 35 U.S.C. 154(b) by 21 days.

(21) Appl. No.: 15/260,708

(22) Filed: Sep. 9, 2016

(65) Prior Publication Data

US 2016/0381754 A1 Dec. 29, 2016

Related U.S. Application Data

(63) Continuation of application No. 14/280,048, filed on May 16, 2014, now Pat. No. 9,474,113.

(51) Int. Cl.
 *H05B 41/36* (2006.01)
 *H05B 45/10* (2020.01)
 (Continued)

(52) U.S. Cl.
 CPC ............ *H05B 45/10* (2020.01); *F21K 9/235* (2016.08); *F21K 9/238* (2016.08); *F21S 8/026* (2013.01);
 (Continued)

(58) Field of Classification Search
 CPC ............ H05B 33/0803; H05B 33/0896; H05B 37/036; H05B 39/06; H05B 1/02;
 (Continued)

(56) References Cited

U.S. PATENT DOCUMENTS

| 4,614,897 A | * | 9/1986 | Kumbatovic | ...... H05B 41/3925 |
| | | | | 315/224 |
| 5,691,889 A | * | 11/1997 | Bazinet | ................ H02M 3/156 |
| | | | | 323/222 |

(Continued)

OTHER PUBLICATIONS https://en.wikibooks.org/wiki/Digital_Circuits/Latches (Year: 2010).*

(Continued)

*Primary Examiner* — Bryan R Perez
(74) *Attorney, Agent, or Firm* — Brian D. Kaufman; Robert D. Atkins; Patent Law Group: Atkins and Associates, P.C.

(57) ABSTRACT

A light-emitting diode (LED) lighting device has an LED and a power supply including an inductor coupled to the LED. A cathode of the LED is coupled to the inductor opposite an anode of the LED. The inductor is coupled for receiving a first power signal. A transistor includes a conduction terminal coupled to the inductor to enable current through the inductor. A current from the first power signal is switched to generate a second power signal. A first diode includes an anode coupled to the inductor opposite the cathode of the LED. A controller includes a first terminal coupled to a cathode of the first diode and a second terminal coupled to a control terminal of the transistor. A zener diode is coupled to the first terminal of the controller. A capacitor is coupled between the first diode and inductor. A second diode is coupled to the first diode.

19 Claims, 11 Drawing Sheets

(51) Int. Cl.

| | |
|---|---|
| *H05B 39/08* | (2006.01) |
| *H05B 41/282* | (2006.01) |
| *H05B 45/37* | (2020.01) |
| *H05B 45/50* | (2020.01) |
| *H05B 47/19* | (2020.01) |
| *F21V 29/77* | (2015.01) |
| *F21K 9/238* | (2016.01) |
| *F21K 9/235* | (2016.01) |
| *F21S 8/02* | (2006.01) |
| *F21V 3/00* | (2015.01) |
| *F21V 21/088* | (2006.01) |
| *F21V 23/00* | (2015.01) |
| *F21V 23/02* | (2006.01) |
| *H05B 41/392* | (2006.01) |
| *H05B 39/04* | (2006.01) |
| *F21Y 115/10* | (2016.01) |

(52) U.S. Cl.
CPC ............. *F21V 3/00* (2013.01); *F21V 21/088* (2013.01); *F21V 23/001* (2013.01); *F21V 23/02* (2013.01); *F21V 29/77* (2015.01); *H05B 39/08* (2013.01); *H05B 41/2828* (2013.01); *H05B 45/37* (2020.01); *H05B 45/50* (2020.01); *H05B 47/19* (2020.01); *F21Y 2115/10* (2016.08); *H05B 39/04* (2013.01); *H05B 41/36* (2013.01); *H05B 41/3921* (2013.01)

(58) Field of Classification Search
CPC ........................ H05B 37/02; H05B 33/0815; H05B 33/0836; H05B 39/04; H05B 41/2828; H05B 41/36; H05B 41/3921; H05B 41/3927; H05B 33/0827; H05B 33/0818
USPC .......... 362/294; 315/185 R, 209 R, 291, 299
See application file for complete search history.

(56) References Cited

U.S. PATENT DOCUMENTS

| | | |
|---|---|---|
| RE39,933 E | 12/2007 | Hall et al. |
| 7,883,243 B2 | 2/2011 | Snyder |
| 7,952,293 B2 | 5/2011 | Kelly |
| 8,004,260 B2 | 8/2011 | Irving et al. |
| 8,444,299 B2 | 5/2013 | Chou et al. |
| 8,476,842 B2 | 7/2013 | Chuang et al. |
| 8,502,463 B2 | 8/2013 | Mizukawa et al. |
| 8,531,112 B2 | 9/2013 | Wang |
| 8,581,498 B1* | 11/2013 | Cheung .............. H05B 33/0815 315/119 |
| 2009/0195186 A1 | 8/2009 | Guest et al. |
| 2009/0273297 A1* | 11/2009 | Kelly .................. H02M 1/4225 315/247 |
| 2010/0052569 A1 | 3/2010 | Hoogzaad et al. |
| 2010/0244791 A1* | 9/2010 | Nirschl .................. G11C 5/147 323/282 |
| 2011/0037387 A1 | 2/2011 | Chou et al. |
| 2011/0037418 A1 | 2/2011 | Park |
| 2011/0080110 A1* | 4/2011 | Nuhfer ............... H05B 33/0815 315/291 |
| 2011/0255319 A1 | 10/2011 | Ayukawa et al. |
| 2011/0260647 A1 | 10/2011 | Catalano et al. |
| 2012/0049758 A1* | 3/2012 | Hwang .............. H05B 33/0815 315/291 |
| 2012/0249001 A1* | 10/2012 | Okubo ............... H05B 33/0815 315/200 R |
| 2012/0256606 A1* | 10/2012 | van den Broeke ... H02M 3/158 323/267 |
| 2013/0076246 A1* | 3/2013 | Okawa ............... H05B 33/0896 315/121 |
| 2013/0207571 A1* | 8/2013 | Esaki ..................... H05B 37/02 315/297 |
| 2013/0285563 A1* | 10/2013 | Iwai ...................... H05B 37/02 315/185 R |
| 2014/0028271 A1* | 1/2014 | Kondou ................ H02M 3/156 323/271 |

OTHER PUBLICATIONS

Fairchild Semiconductor, "Application Note AN4107 Design of Power Factor Correction Using FAN7527", pp. 1-14, Rev. 1.0.2., May 2000.
Melexis Microelectronic Integrated Systems, "Evaluation Board EVB10803 Power LED Driver for Automotive Applications", pp. 1-8, Mar. 2006.
Melexis Microelectronic Integrated Systems, "IC Specification MLX10803 High Power LED Driver", pp. 1-25, Jun. 2012.
Electronic Theater Controls "Dimming Information" pp. 1-2, Mar. 24, 2015, http://www.etcconnect.com/Community/wikis/products/dimming-information_aspx.
Illuminating Engineering Society "Lighting Control Protocols", IES TM-23-11, pp. 1-41, Apr. 4, 2011, Illuminating Engineering Society of North America, 120 Wall Street, New York, New York 10005.
Bernard Grob, Mitchel E. Schultz; Basic Electronics; 2003 by The McGraw-Hill Companies, Inc.; 9th Edition; p. 587.

* cited by examiner

DIMMABLE UNIVERSAL VOLTAGE LED POWER SUPPLY WITH REGENERATING POWER SOURCE CIRCUITRY AND NON-ISOLATED LOAD

CLAIM TO DOMESTIC PRIORITY

The present application is a continuation of U.S. patent application Ser. No. 14/280,048, now U.S. Pat. No. 9,474,113, filed May 16, 2014, which application is incorporated herein by reference.

FIELD OF THE INVENTION

The present invention relates in general to power supplies and, more particularly, to a dimmable light-emitting diode (LED) power supply with a regenerating power source and non-isolated load which accepts a universal voltage input.

BACKGROUND OF THE INVENTION

LEDs have been used for decades in applications requiring relatively low-energy indicator lamps, numerical readouts, and the like. In recent years, the brightness and power of individual LEDs have increased substantially, resulting in the availability of devices capable of high power output.

While small, LEDs exhibit a high efficacy and life expectancy compared to traditional lighting products. A typical incandescent bulb has an efficacy of 10 to 12 lumens per watt and lasts for about 1,000 to 2,000 hours; a typical fluorescent bulb has an efficacy of 40 to 80 lumens per watt and lasts for 10,000 to 20,000 hours; a typical halogen bulb has an efficacy of 15 lumens per watt and lasts for 2,000 to 3,000 hours. In contrast, today's white LEDs can emit more than 140 lumens per watt with a life expectancy of about 100,000 hours.

Thus, LED lights are efficient, long-lasting, cost-effective, and environmentally friendly. For the above reasons, LED lighting is rapidly becoming the light source of choice in many applications. Significant interest exists in replacing lighting products currently in use, such as incandescent and compact fluorescent (CFL) bulbs, with a corresponding LED lamp that has the same form, fit, and function. For a particular lighting fixture that uses an A19 bulb, it is desirable to "swap out" a 60 W incandescent bulb with an LED lamp that emits approximately the same amount of light but has a much longer life expectancy and reduced operating cost.

The term "Energy Star" refers to the U.S. government's energy performance rating system program that is jointly managed by the U.S. Department of Energy (DOE) and the U.S. Environmental Protection Agency (EPA). According to Energy Star guidelines, a 40 W incandescent bulb nominally emits 450 lumens, while a 60 W incandescent bulb nominally emits 800 lumens. Thus, to be considered a valid replacement for a 60 W incandescent bulb, an LED lamp should emit at least 800 lumens.

LED lamp manufacturers strive to improve LED lamps. Some important ways that manufacturers can improve LED lamps is in LED emitter luminous efficacy, AC to DC power supply conversion efficiency, power factor, optics, and thermal management. Luminous efficacy is a measure of how well an LED emitter produces visible light, i.e., the ratio of visible light produced to power consumed by the LED emitter. LED lamp manufacturers want to produce LED lamps which generate more light for the same amount of energy consumed, or consume less energy yet generate the same light output. The efficiency of LED lamps can be improved by utilizing LED emitters which consume less energy when generating light, or power conversion efficiency can be improved by reducing the amount of energy consumed by control logic in the LED lamp's power supply. As lower power consumption LEDs are developed, control logic consumes a higher percentage of the total power of an LED lamp, and reducing the power consumption of the control logic has a greater effect on total efficacy.

Power factor is the ratio of real power consumed by an LED lamp and the apparent power flowing through the LED lamp's circuits. A power factor of 1 is ideal, and indicates that AC power is being utilized by an electronic circuit during the entire period of the AC sine wave, i.e. 0 to 360 degrees. With a power factor of 1, all power flowing to the LED lamp is being consumed by the LED lamp. The power factor can be lowered when the LED lamp is consuming energy for only a portion of the AC phase, or when the LED lamp is consuming power out of phase with the alternating current (AC) power source. A low power factor indicates that more current is being transmitted to the LED lamp than is actually needed to power the LED lamp. A low power factor results in unbalanced loading in the power transmission and distribution lines, and unnecessary power loss.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, one skilled in the art will appreciate that the description is intended to cover alternatives, modifications, and equivalents as may be included within the spirit and scope of the invention as defined by the appended claims and the equivalents as supported by the following disclosure and drawings.

LEDs have been used for decades in applications requiring relatively low-energy. In recent years, the brightness and power of individual LEDs have increased substantially, resulting in the availability of LED packages ranging from 0.1 watt up to 100 watt and suitable for use in larger scale lighting applications.

While small, LEDs exhibit a high efficacy and life expectancy compared to traditional lighting products. A typical incandescent bulb has an efficacy of 10 to 12 lumens per watt and lasts for about 1,000 to 2,000 hours; a typical fluorescent bulb has an efficacy of 40 to 80 lumens per watt and lasts for 10,000 to 20,000 hours; a typical halogen bulb has an efficacy of 15 lumens per watt and lasts for 2,000 to 3,000 hours. In contrast, today's white LEDs can emit more than 140 lumens per watt with a life expectancy of about 100,000 hours.

LED lighting sources provide a brilliant light, sufficient to illuminate an area in home, office, or commercial settings. LED lighting is efficient, long lasting, cost-effective, and environmentally friendly. LEDs emit light in a specific direction and light an area more efficiently than lamps that produce omni-directional light, wasting energy illuminating a ceiling, the inside of a light fixture, or other areas that do not need to be lit. LEDs are dimmable, come in a variety of color options, and have an instant turn-on unlike halogen and fluorescent lamps which require a warm-up period to achieve full brightness. Unlike a fluorescent lamp, an LED light source emits a constant, non-flickering light and can be turned on and off more rapidly than the eye can see, up to millions of times per second, with no degradation in the operating life of the LED light source. For the above reasons, LED lighting is rapidly becoming the light source of choice in many applications.

LED lighting relies on LED emitters or light engines to generate the light energy emitted from an LED light source. A light engine consists of a plurality of individual LED devices electrically interconnected over a substrate. A power supply energizes the LED devices via connection terminals on the substrate, and the energized LEDs produce light.

Figure 1A:
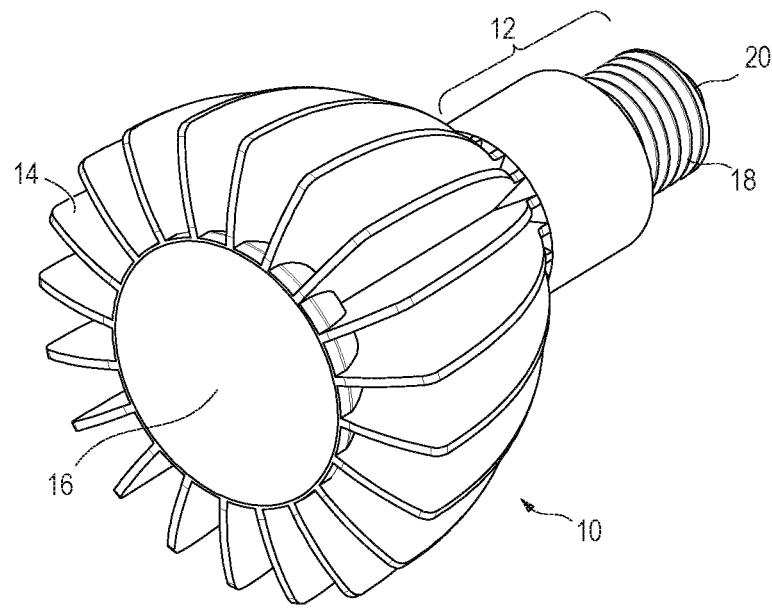
FIGS. 1a-1b illustrate an LED lamp.

FIG. 1a illustrates an LED lamp 10. The external components of LED lamp 10 include base 12, heatsink 14, and window or lens 16. Base 12 is screwed or snapped onto heatsink 14, or held onto the heatsink by other suitable means. Lens 16 is mounted to heatsink 14 using friction coupling, fasteners, adhesive, or another suitable attachment mechanism, and encloses the internal components of LED lamp 10.

LED lamp 10 replaces an incandescent light bulb in a common household light bulb socket. Base 12 is configured to fit an E26 or E27 light bulb socket. Threads 18 provide a screw-like interface to the light bulb socket, and hold LED lamp 10 into the socket. Threads 18 are electrically connected to a power supply board internal to LED lamp 10. The light bulb socket includes metal threads that correspond to threads 18 on LED lamp 10. When LED lamp 10 is fully screwed into the light bulb socket, friction between the metal threads of the socket and threads 18 provides grip to hold the LED lamp in the socket, as well as electrical connection between threads 18 and the neutral wire of the alternating current (AC) supply. The light bulb socket holds LED lamp 10 stationary via base 12 so that light emanating from the LED lamp illuminates a fixed area.

Tip 20 is electrically connected to the power supply board internal to LED lamp 10. Tip 20 touches a contact in the bottom of the light bulb socket when LED lamp 10 is fully screwed into the socket. The light bulb socket provides electrical connection between tip 20 and the live wire of the AC supply. The contact in the bottom of the light bulb socket is a spring or other mechanism that is conductive and applies force against tip 20 to ensure good electrical connection.

Together, threads 18 and tip 20 provide AC power to the power supply board in LED lamp 10 via the light bulb socket connection. LED lamp 10 also works properly when threads 18 and tip 20 are connected to a DC power source.

LED lamp 10 is powered by either a 120 volt or 277 volt AC supply, which are the two major supply voltages for indoor lighting in the United States. LED lamp 10 automatically configures to either 120 volt mode or 277 volt mode based on the detected AC supply voltage. External dimming mechanisms control the brightness of LED lamp 10 by varying the magnitude of AC power input to the LED lamp. An internal control mechanism switches LED lamp 10 to 277 volt mode when an input voltage over 135 volts is detected, and retains the LED lamp in 277 volt mode when the input voltage drops below 135 volts to provide smooth dimming.

Heatsink 14 is composed of one or more thermally conductive materials such as copper (Cu), aluminum (Al), or a carbon composite material. Heatsink 14 cools the internal components of LED lamp 10 by absorbing heat generated by the internal components and dissipating the heat into the surrounding air. Heatsink 14 includes a number of fins running longitudinally to provide increased surface area between the heatsink and the surrounding air. Heatsink 14 is thermally connected to the components of the power supply in LED lamp 10 via a mechanical connection between the heatsink and power supply. Additionally, heatsink 14 absorbs heat from the power supply in LED lamp 10 via convection and radiation. Heatsink 14 also provides the internal components of LED lamp 10, including the power supply, with physical support and protection.

Lens 16 is mounted to heatsink 14 using friction coupling, fasteners, adhesive, or another suitable attachment mechanism. Lens 16 is clear or coated with one or more light-diffusing materials. Depending upon the application, lens 16 is transparent, translucent, or frosty and includes polarizing filters, colored filters, or additional lenses such as concave, convex, planar, "bubble," and Fresnel lenses. Lens 16 conditions light emanating from LED lamp 10 so that the light fulfills the intended purpose for using the LED lamp. LED lamp 10 is manufactured with an interchangeable lens 16 to customize characteristics of the light from the LED lamp when the need arises.

The size and shape of heatsink 14 conform to the BR30 standard shape used for flood lights. LED lamp 10 fits for use in most household applications where incandescent flood lights were previously used. In other embodiments, base 12, heatsink 14, and lens 16 are manufactured to fit other standard light bulb sockets and shapes, such as the A19 light bulb used for many household applications. For some uses where retrofitting to a light bulb socket is not necessary, the power supply and light engine of LED lamp 10 are configured to be used without base 12, heatsink 14, and lens 16 (e.g., an automobile instrument panel or lighting integrated into a product).

Figure 1B:
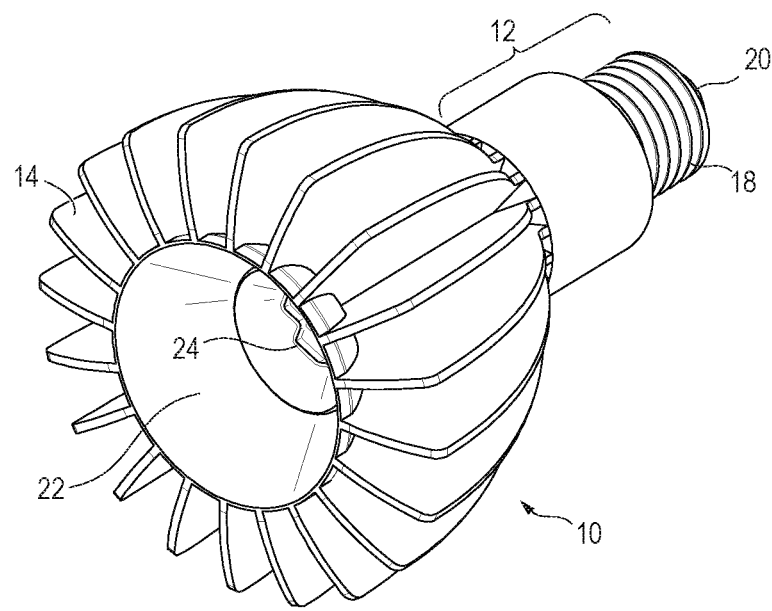

FIG. 1b illustrates LED lamp 10 with lens 16 removed to reveal conic reflector 22 and LED emitter or light engine 24. Conic reflector 22 reduces glare and confines light emitted by LED light engine 24 to a desired area. In other embodiments, conic reflector 22 is not used and LED light engine 24 is mounted directly under lens 16. LED light engine 24 includes one or more LEDs mounted on a substrate, and provides the light for LED lamp 10. The substrate of LED light engine 24 routes the electric current from the power supply to the one or more LEDs mounted on the substrate. When the power supply voltage exceeds the minimum threshold for turning on the LEDs of LED light engine 24, current flows through the LED light engine and the LEDs produce light.

LED light engine 24 is mounted on a heat spreader plate within LED lamp 10. A thermally conductive material, such as thermal grease, a thermal interface pad, or a phase change pad, is deposited between LED light engine 24 and the heat spreader plate to improve heat transfer. The heat spreader plate is composed of or includes a thermally conductive material or materials. Heatsink 14 is thermally connected to LED light engine 24 via the heat spreader plate, and heat energy is conducted from the LED light engine to the heatsink via the heat spreader plate.

Figure 2A:
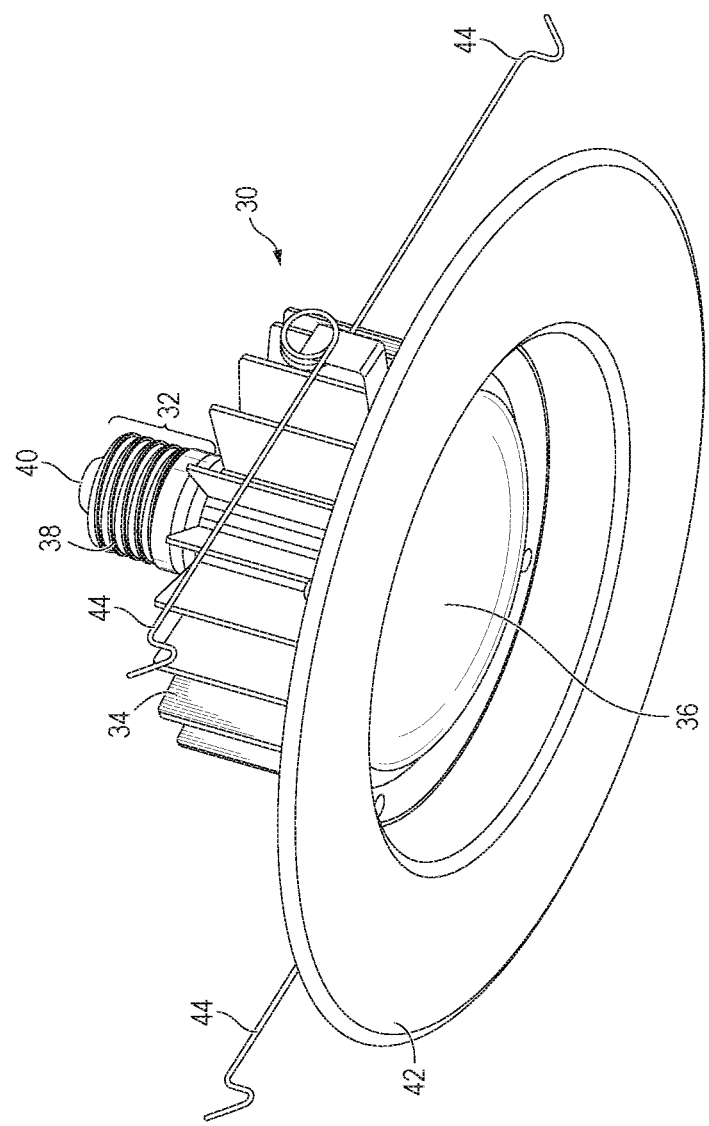
FIGS. 2a-2b illustrate an LED lamp for use with a recessed can housing.

FIG. 2a illustrates an LED lamp 30 for use in recessed lighting. LED lamp 30 includes base 32 mounted to heatsink 34. Lens 36 is mounted to heatsink 34 opposite base 32. LED lamp 30 includes LED light engine 24 installed under lens 36 and facing so that light emanating from the LED light engine travels through the lens. Base 32 is similar to base 12 of LED lamp 10. Heatsink 34 is similar to heatsink 14 of LED lamp 10. Lens 36 is similar to lens 16 of LED lamp 10. Base 32 includes threads 38 and tip 40. LED lamp 30 also includes trim 42 mounted to heatsink 34 using screws or other suitable means. Clips 44 are connected to heatsink 34 or trim 42. Trim 42 includes a flange that, after installation of LED lamp 30 into a recessed can housing, protrudes from the recessed can housing. Heatsink 34 is coupled to trim 42 to facilitate removal of heat energy from the trim.

Figure 2B:
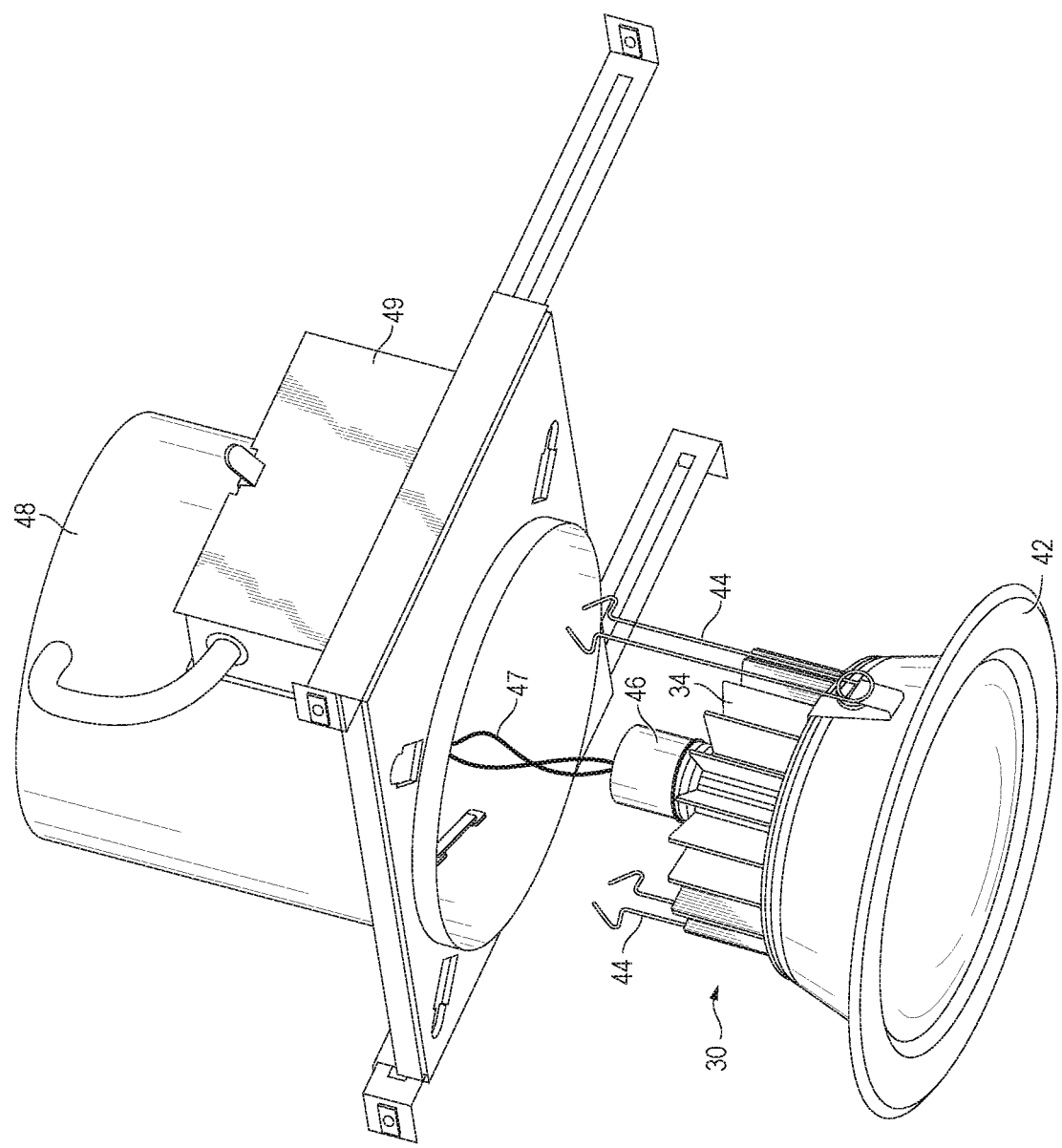

FIG. 2b illustrates LED lamp 30 being installed into recessed can housing 48. Recessed can housing 48 is typically installed into a ceiling or other surface where a light source is required. Socket 46 hangs loose on wires 47 within recessed can housing 48 and is screwed onto base 32 to provide AC power to LED lamp 30. Clips 44 are spring loaded. Clips 44 are compressed upward to fit into recessed can housing 48. Once LED lamp 30 is within recessed can housing 48, clips 44 are released and apply pressure to the inside of the recessed can housing. The pressure of clips 44 against recessed can housing 48 holds LED lamp 30 in place via friction. LED lamp 30 is inserted into recessed can housing 48 to the point where trim 42 is against a ceiling or other surface.

Socket 46 is connected to the AC supply by wires 47. Wires 47 allow socket 46 to hang loose within recessed can housing 48. Wires 47 run through recessed can housing 48 to junction box 49, where wires 47 are coupled to wires from the main AC supply.

Figure 3A:
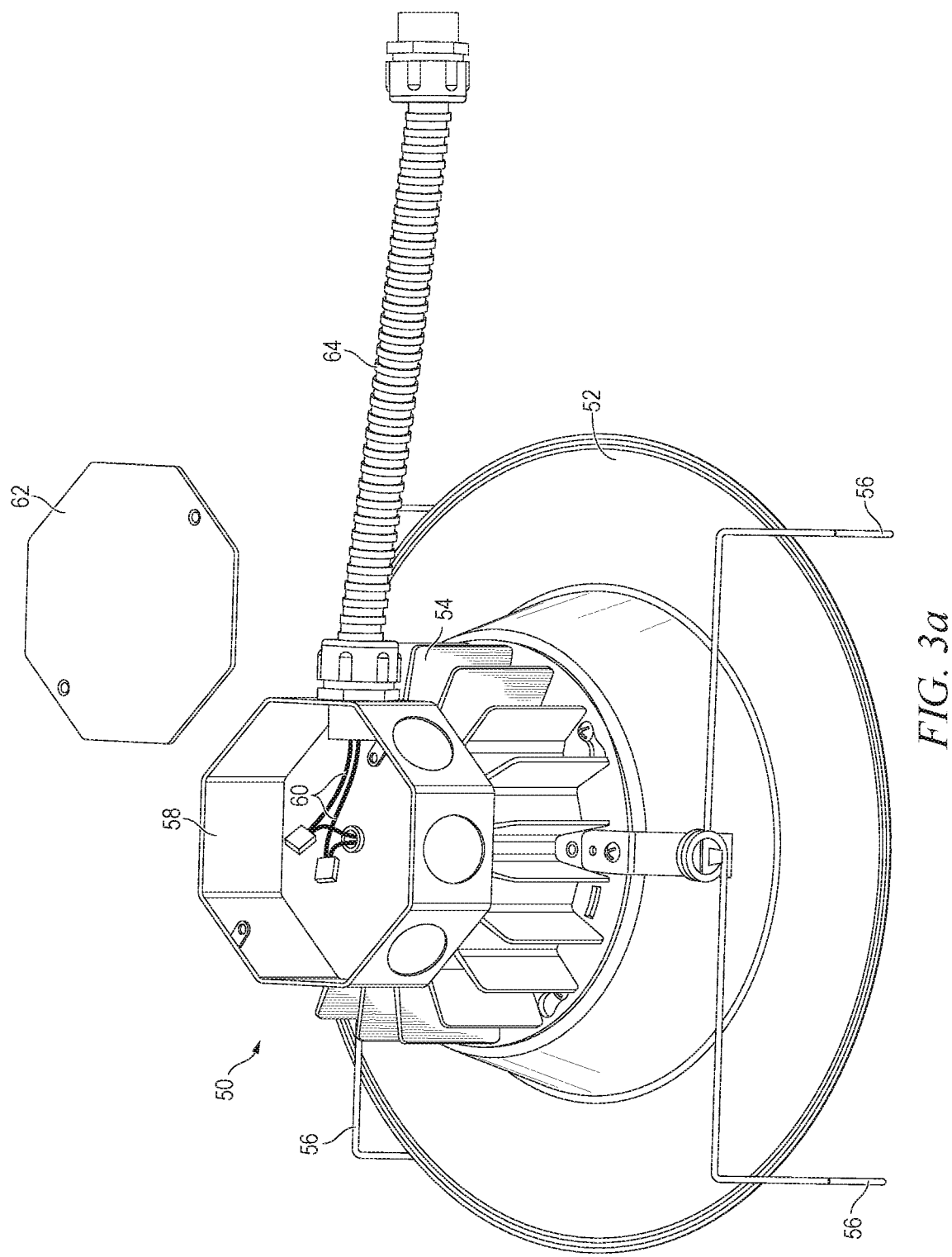
FIGS. 3a-3b illustrate an LED lamp for use with a ceiling tile.

FIG. 3a illustrates LED lamp 50 for mounting within a ceiling. LED lamp 50 includes trim 52 mounted to heatsink 54. Clips 56 are attached to heatsink 54 or trim 52 using a bracket and screw or other suitable means. Junction box 58 is mounted on heatsink 54. Wires 60 provide the AC supply voltage to LED lamp 50. Junction box cover 62 is installed over junction box 58 once wires 60 are coupled to wires running into LED lamp 50. Electrical conduit 64 is attached to junction box 58. Heatsink 54 is similar to heatsink 34 and heatsink 14. Trim 52 is similar to trim 42. LED lamp 50 includes a lens similar to lens 36 of LED lamp 30, and LED light engine 24 installed under the lens, which are not illustrated.

Clips 56 are spring loaded and compressed upward for installation of LED lamp 50 into a ceiling or ceiling tile. LED lamp 50 also installs into any other surface with a properly sized opening. LED lamp 50 is inserted through the surface opening with electrical conduit 64 inserted first, and then junction box 58 and heatsink 54 follow the electrical conduit through the opening. LED lamp 50 is inserted to the point where trim 52 contacts the ceiling or other surface. Clips 56 are released to apply pressure to the ceiling. Clips 56 apply pressure to the ceiling to squeeze the ceiling between the clips and trim 52. Once LED lamp 50 is installed, wires 60 are guided through electrical conduit 64 and coupled to the wires from the LED lamp. Junction box cover 62 is mounted over junction box 58 using screws, clips, or other suitable means, to protect the coupling of wires 60.

Figure 3B:
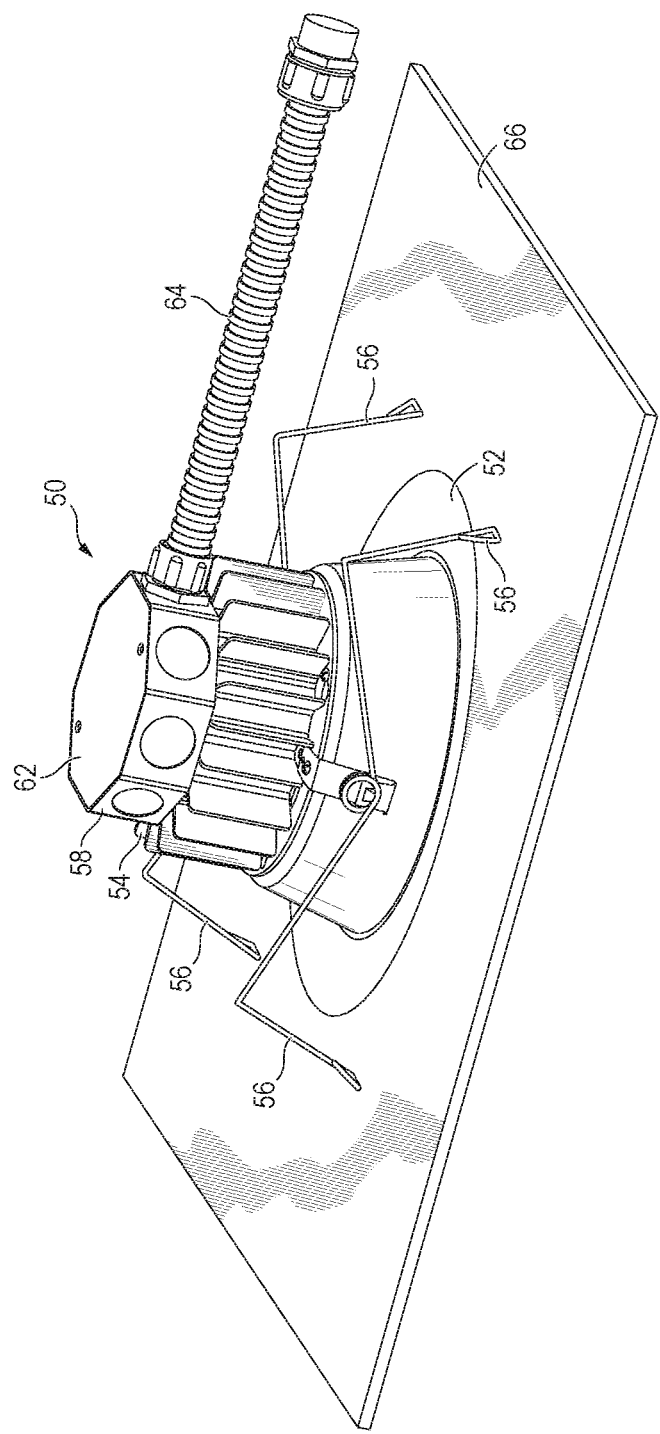

FIG. 3b illustrates LED lamp 50 installed in ceiling tile 66. Ceiling tile 66 is disposed between clips 56 and trim 52. Clips 56 apply pressure against ceiling tile 66 and trim 52 to hold LED lamp 50 in place in the ceiling tile. LED lamp 50 is installed in ceiling tile 66 while the ceiling tile is installed in a ceiling, or the ceiling tile is removed for installation of the LED lamp. LED lamp 50 is also installable in a ceiling or other surface without removable tiles.

Figure 4:
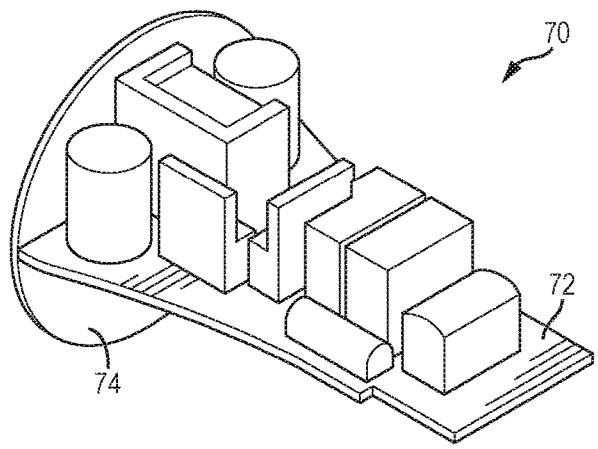
FIG. 4 illustrates a power supply board for an LED lamp.

FIG. 4 illustrates power supply 70 for use in LED lamp 10. LED lamp 30 and LED lamp 50 include power supplies similar to power supply 70, but the power supply is oriented differently depending on the requirements of the specific embodiment. Power supply 70 includes one or more discrete circuit components (e.g., capacitors, inductors, resistors, and transistors) and integrated circuits mounted or formed on circuit board 72. The electrical components on circuit board 72 are electrically connected by traces of the circuit board in order to constitute power supply 70. Details of the electrical components, and the electrical connections between the components, which form power supply 70 are presented below.

Power supply 70 is mounted on heat spreader plate 74. LED light engine 24 is mounted on heat spreader plate 74 opposite power supply 70. Power supply 70 is disposed within LED lamp 10 with heat spreader plate 74 oriented toward lens 16, so that light emanating from LED light engine 24 goes through the lens. The end of power supply 70 opposite heat spreader plate 74 is oriented toward base 12. Power supply 70 is connected to an AC supply voltage via threads 18 and tip 20 of base 12. The power supply in LED lamp 30 is connected to an AC supply via threads 38 and tip 40. The power supply in LED lamp 50 is connected to an AC supply via wires 60 running through conduit 64 and junction box 58.

Heat spreader plate 74 is composed of or includes a thermally conductive material or materials. Heat spreader plate 74 is thermally and mechanically connected to heatsink 14. Heatsink 14 is thermally connected to LED light engine 24 via heat spreader plate 74, and heat energy is conducted from the LED light engine to the heatsink via the heat spreader plate.

Power supply 70 provides four key features. First, power supply 70 includes regenerating power source circuitry. The regenerating power source circuitry provides a secondary power tapped from an induction coil which is able to provide power to control circuitry on power supply 70 with very low power consumption. Secondly, power supply 70 accepts a universal voltage input and maintains a power factor greater than 0.9. Power supply 70 accepts a 120 volt or 277 volt supply voltage. Third, power supply 70 accepts a dimmed supply voltage that is at any voltage under 277 volts. Power supply 70 is compatible with external dimmers, such as wall pack dimmers and other sophisticated dimming systems available on the market. Power supply 70 provides smooth dimming of the light from LED light engine 24 by using internal circuitry to keep the power supply in 277 volt mode when the input voltage returns below 120 volts. Fourth, power supply 70 provides for a non-isolated load. The non-isolated load uses a single coil which allows a high AC to DC conversion efficiency while remaining compact. Fewer parts are needed compared to a power supply with an isolated load.

The circuitry and features of power supply 70 are usable in other situations where AC to DC power conversion is needed. The regenerating power supply circuitry reduces the power consumed by control logic, and is equally effective whether the load of power supply 70 is an LED or another load powered by DC electricity. Power supply 70 provides DC power, including the features of a regenerating power source, universal voltage, dimmable power, and a non-isolated load, to any device. LED light engine 24 is replaced by any desired load.

Figure 5:
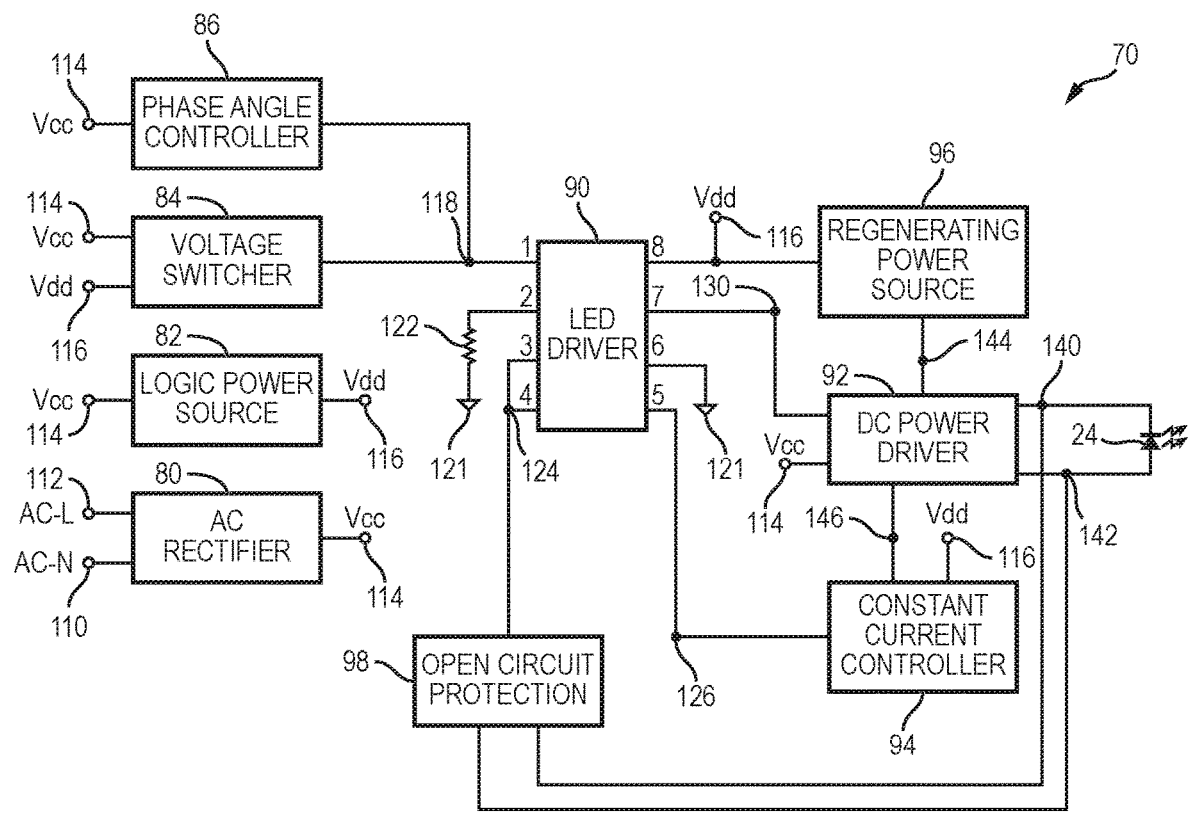
FIG. 5 is a schematic and block diagram of the power supply for the LED lamp.

FIG. 5 illustrates a schematic and block diagram for power supply 70. The major blocks of power supply 70 include AC rectifier 80, logic power source 82, voltage switcher 84, phase angle controller 86, LED driver 90, DC power driver 92, constant current controller 94, regenerating power source 96, and open circuit protection 98. LED driver 90 is a controller which regulates the current through LED light engine 24. In the illustrated embodiment, LED driver 90 is an 8-pin integrated circuit (IC) package, part number MLX10803, manufactured by Melexis. The pins of LED driver 90 are also referred to as terminals.

The Melexis IC, part number MLX10803, controls current through LED light engine 24 using a control signal with a fixed off-time and a variable on-time. The on-time, and thus the frequency, of the control signal is adjusted by the Melexis IC to regulate power to LED light engine 24. In another embodiment, a controller IC is used for LED driver 90 which utilizes a fixed frequency control signal. With a fixed frequency control signal, the duty cycle of the control signal is adjusted to regulate power to LED light engine 24. Duty cycle is the ratio between the on-time and off-time of the control signal during each period of the control signal.

The AC power flowing through threads 18 and tip 20 of base 12 is electrically connected as an input of AC rectifier 80. AC neutral node 110 is electrically connected to the neutral AC supply line via threads 18, and AC live node 112 is electrically connected to the live AC supply line via tip 20. Together, AC neutral node 110 and AC live node 112 provide AC power to AC rectifier 80. AC rectifier 80 rectifies the AC input at AC neutral node 110 and AC live node 112 into a pulsed DC output signal on Vcc node 114. Vcc node 114 is coupled as an input providing power to logic power source 82, voltage switcher 84, phase angle controller 86, and DC power driver 92. Logic power source 82 accepts Vcc node 114 as an input, and outputs a separate DC power signal on Vdd node 116. Vdd node 116 is coupled to provide power to logic and memory components in voltage switcher 84, LED driver 90 via pin 8, and constant current controller 94. Voltage switcher 84 and phase angle controller 86 have outputs connected to circuit node 118, which is coupled to pin 1 of LED driver 90. LED driver 90 also has an input on pin 2 coupled to ground node 121 through resistor 122. Pins 3 and 4 of LED driver 90 are coupled to a single output of open circuit protection 98 via circuit node 124, pin 5 is coupled to constant current controller 94, and pin 6 is coupled to ground node 121. LED driver 90 provides an output on pin 7 coupled to DC power driver 92 via circuit node 130. DC power driver 92 outputs DC power to LED light engine 24 via negative LED node 140 and positive LED node 142. Negative LED node 140 is connected to a negative terminal on LED light engine 24 (i.e., cathode), and positive LED node 142 is connected to a positive terminal on the LED light engine (i.e., anode). DC power driver 92 also has outputs coupled to regenerating power source 96 via circuit node 144 and constant current controller 94 via circuit node 146. Regenerating power source 96 has an output connected to Vdd node 116.

AC rectifier 80 accepts an AC power signal as input on AC neutral node 110 and AC live node 112. AC rectifier 80 accepts 120 volts AC, 277 volts AC, or any AC voltage under 277 volts. 120 volts and 277 volts are the two major supply voltages for indoor lighting in the United States. AC rectifier 80 also accepts a variable AC input voltage. External dimming mechanisms commonly available on the market control the brightness of LED lamp 10 by varying the magnitude of AC input to the LED lamp, and thus AC rectifier 80. In some embodiments, an external dimming mechanism dims LED lamp 10 by cutting off the AC supply signal for a portion of the AC sine wave. When the AC input signal between AC neutral node 110 and AC live node 112 is varied by a dimming mechanism, the pulsed DC signal on Vcc node 114 varies to remain approximately proportional to the AC input signal. AC rectifier 80 works properly with a DC input voltage.

AC rectifier 80 contains a full-wave rectifier to convert the input AC power signal on AC neutral node 110 and AC live node 112 to a pulsed DC signal on Vcc node 114. An input filter in AC rectifier 80 reduces high frequency components of the input AC supply signal, and reduces high frequency signals generated by power supply 70 flowing back out to the AC supply. AC rectifier 80 contains capacitors connected between Vcc node 114 and ground node 121 to filter the pulsed DC signal.

Logic power source 82 has Vcc node 114 as an input, and generates a DC signal on Vdd node 116. Logic power source 82 includes a capacitor to filter the pulsed DC signal on Vcc node 114 into a steady DC voltage on Vdd node 116. A zener diode in logic power source 82 regulates the voltage level at Vdd node 116. Vdd node 116 provides a DC voltage level usable by integrated circuits and other memory or logic devices. Logic power source 82 contains a transistor which controls whether the logic power source couples Vcc node 114 to Vdd node 116 to provide power to the Vdd node. The transistor in logic power source 82 disconnects Vdd node 116 from being powered by Vcc node 114 when regenerating power source 96 is supplying sufficient voltage on the Vdd node.

Voltage switcher 84 detects the AC input voltage supplied to AC rectifier 80 by sensing the voltage level on Vcc node 114, which is a similar signal to the AC input at AC neutral node 110 and AC live node 112 but with positive voltages when the input AC includes negative voltages. When voltage switcher 84 detects the AC input voltage is greater than 135 volts, the voltage switcher uses an output to pin 1 of LED driver 90, via circuit node 118, to change the operating mode of the LED driver from 120 volt to 277 volt operating mode. If LED lamp 10 is operating in 277 volt mode, and the AC input voltage falls below 135 volts, voltage switcher 84 retains LED driver 90 in 277 volt mode.

Voltage switcher 84 accepts Vcc node 114 and Vdd node 116 as inputs, and has an output coupled to pin 1 of LED driver 90 via circuit node 118. The voltage at circuit node 118, i.e., pin 1 of LED driver 90, is initially controlled by phase angle controller 86. When the AC input to AC rectifier 80 reaches a level over 135 volts, a latch in voltage switcher 84 is enabled. The latch in voltage switcher 84 turns on a transistor in the voltage switcher. The transistor in voltage switcher 84 allows current to flow from circuit node 118 to ground node 121 through a resistor in the voltage switcher.

The value of the resistor is chosen to lower the voltage on circuit node 118 (i.e., pin 1 of LED driver 90) to a known value. The voltage change on pin 1 of LED driver 90 when the latch in voltage switcher 84 is enabled reconfigures the LED driver from 120 volt operation to 277 volt operation. The latch in voltage switcher 84 causes 277 volt mode to remain enabled when the AC input to AC rectifier 80 falls below 135 volts. When the AC supply signal input to LED lamp 10 is dimmed above and then below 135 volts, the LED lamp dims smoothly because 277 volt mode is maintained by the latch in voltage switcher 84. Power supply 70 with voltage switcher 84 enables LED lamp 10 to be used with external wall pack dimmers or other sophisticated dimming systems available on the market. Voltage switcher 84 delivers smooth dimming of the light from LED light engine 24.

Phase angle controller 86 improves the power factor of power supply 70. Phase angle controller 86 provides power supply 70 a power factor greater than 0.9. The power factor is raised by improving the alignment between the current used by power supply 70 and the voltage from the AC supply. Phase angle controller 86 outputs a signal to pin 1 of LED driver 90 via circuit node 118. The voltage level on pin 1 of LED driver 90 controls the amount of current that the LED driver allows to flow through LED light engine 24. Phase angle controller 86 outputs a voltage signal to pin 1 of LED driver 90 that is approximately proportional to the voltage at Vcc node 114. Vcc node 114 carries a signal that is similar to the signal of the AC supply, with the Vcc node rectified to have positive values when the AC supply has negative values. By controlling the current used by LED light engine 24 to be approximately proportional to the input AC voltage, the power factor is improved. Controlling the current used by LED light engine 24 to be approximately proportional to the input AC voltage also dims LED lamp 10.

LED driver 90 uses pin 7 as an output to control current through LED light engine 24 via DC power driver 92. LED driver 90 switches a voltage on pin 7 on and off rapidly to regulate the current through LED light engine 24. When LED driver 90 outputs a voltage on pin 7, current flows through an inductor in DC power driver 92. As the current through the inductor rises, the inductor stores energy magnetically. LED driver 90 detects the current flow through the inductor in DC power driver 92 via feedback through constant current controller 94 and pin 5 of the LED driver. When LED driver 90 detects that current through the inductor in DC power driver 92 has reached an upper threshold, the LED driver turns off voltage at pin 7 to stop increasing the current.

When LED driver 90 removes the voltage from pin 7, the inductor in DC power driver 92 releases the stored energy into LED light engine 24 via negative LED node 140 and positive LED node 142. The current threshold at which LED driver 90 turns off the voltage on pin 7 is controlled by the voltage on input pin 1 of the LED driver. LED driver 90 turns the voltage on pin 7 back on when a certain amount of time has elapsed. The time period LED driver 90 waits after shutting off voltage at pin 7 before applying the voltage to pin 7 again is determined by the value of resistor 122, which sets the internal clock frequency of LED driver 90.

Pin 8 and pin 6 of LED driver 90 are power and ground inputs to the LED driver, respectively. Pin 8 receives power from Vdd node 116, and pin 6 is coupled to ground node 121. Pins 3 and 4 of LED driver 90 are inputs that limit the current through the inductor in DC power driver 92, and consequently limit the current through LED light engine 24. Reducing the voltage level at pin 3 or pin 4 of LED driver 90 reduces the time that pin 7 to DC power driver 92 is on, and reduces the current through LED light engine 24. Pin 2 controls the internal oscillator frequency in LED driver 90 based on the value of resistor 122. Pin 1 of LED driver 90 controls the operating range of current through the inductor in DC power driver 92. LED driver 90 will shut off voltage on pin 7 when the voltage on pin 5 reaches 20% of the voltage on pin 1. Therefore, current through LED light engine 24 is accurately controlled by properly setting the voltage at pin 1, and properly configuring a resistor network in constant current controller 94.

DC power driver 92 takes a switching input from pin 7 of LED driver 90 via circuit node 130, and outputs DC power to LED light engine 24 via negative LED node 140 and positive LED node 142. DC power driver 92 also outputs a high frequency power signal to regenerating power source 96 via circuit node 144. The load on power supply 70, i.e., LED light engine 24, is non-isolated. The non-isolation of the load is due to an inductor in DC power driver 92 with a single coil. The single coil of the inductor in DC power driver 92 is electrically connected to the voltage source and the load. A non-isolated load allows power supply 70 to be manufactured cheaper and more compact because a smaller inductor with a single coil is used, and fewer components are required. The non-isolated load also provides a more efficient conversion of AC power to DC.

DC power driver 92 outputs a current to constant current controller 94 via circuit node 146. The inductor of DC power driver 92 is connected in series with a transistor between Vcc node 114 and circuit node 146 to constant current controller 94. When the transistor in DC power driver 92 is turned on, current flows through the inductor of the DC power driver and to constant current controller 94 via circuit node 146. When the transistor in DC power driver 92 is turned off, no current flows through circuit node 146 to constant current controller 94. Current through the inductor instead flows through LED light engine 24.

Pin 7 of LED driver 90 controls the state of the transistor in DC power driver 92. When DC power driver 92 receives a voltage from pin 7 of LED driver 90, the transistor is turned on and current flows from Vcc node 114, through the inductor in DC power driver 92, through the transistor, and to constant current controller 94 via circuit node 146. The inductor in DC power driver 92 stores energy magnetically as current through the inductor rises. When LED driver 90 detects a threshold current has been reached flowing through the inductor, voltage at pin 7 is turned off by the LED driver. When LED driver 90 shuts off voltage at pin 7, the transistor in DC power driver 92 shuts off. DC power driver 92 causes the energy stored magnetically in the inductor to discharge through LED light engine 24 when the transistor is shut off. DC power driver 92 contains a capacitor to filter the power to LED light engine 24 into a more level DC signal. The capacitor in DC power driver 92 charges when the inductor is discharging through LED light engine 24, and discharges to power the LED light engine when the inductor is recharging. The charging and discharging of the capacitor in DC power driver 92 creates a smoother voltage signal at positive LED node 142, and thus smoother light emitted by LED light engine 24.

Constant current controller 94 provides a feedback mechanism allowing LED driver 90 to detect the amount of current flowing through the inductor in DC power driver 92. Current flowing through the inductor in DC power driver 92 flows through constant current controller 94 via circuit node 146. Constant current controller 94 provides a path to ground node 121 for the current through the inductor in DC power driver 92. A configurable resistor network in constant current controller 94 controls the ratio of current through the inductor in DC power driver 92 and voltage at circuit node 126, i.e., pin 5 of LED driver 90. LED driver 90 shuts off current through the inductor in DC power driver 92 when voltage on pin 5 reaches a threshold. Lowering the total resistance for current through constant current controller 94 causes the voltage at pin 5 to be lower for a given current. Put another way, lowering the effective resistance of the resistor network in constant current controller 94 means the current through the inductor in DC power driver 92 reaches a higher value before the voltage threshold on pin 5 of LED driver 90 is reached.

Configuring the resistor network in constant current controller 94 sets the power setting of LED lamp 10. For instance, LED lamp 10 includes settings for 6 watt, 8 watt, 10 watt, or any other desired power setting. There are multiple methods for configuring the resistor network of constant current controller 94. In one embodiment, a jumper array or dual in-line package (DIP) switches are provided on circuit board 72 to manually configure the resistor network. A number of resistors correlate to the jumpers or DIP switches and are added to or removed from the circuit to attain the appropriate resistance to ground node 121. In another case, an integrated circuit adds resistors to the circuit, or removes resistors, by controlling transistors connected in series with the resistors. When an integrated circuit configures the resistor network, Vdd node 116 powers the integrated circuit. The advantage of using an integrated circuit to control the resistor network of constant current controller 94 is that the power setting is controlled remotely.

Regenerating power source 96 receives a high frequency power signal on circuit node 144, which is connected to the output of the inductor in DC power driver 92. Circuit node 144 carries a power signal which is at a higher frequency than the AC power on AC neutral node 110 and AC live node 112. The frequency of the power signal at circuit node 144 is controlled by the frequency at which LED driver 90 switches the output at pin 7 to control DC power driver 92. Regenerating power source 96 converts the high frequency power signal at circuit node 144 into DC, and outputs the DC signal as a second source for Vdd node 116 along with logic power source 82. When regenerating power source 96 is operational, Vdd node 116 is provided power by the regenerating power source. A transistor in logic power source 82 decouples the logic power source from providing power to Vdd node 116 when regenerating power source 96 is operational.

Because of the higher frequency of the power signal input to regenerating power source 96 compared to AC rectifier 80, the regenerating power source provides power to the logic and memory components of power supply 70 at a higher efficiency than AC rectifier 80 and logic power source 82. Regenerating power source 96 provides a secondary power tapped from an inductor or induction coil in DC power driver 92 able to provide power to LED driver 90 with very low power consumption, which boosts the overall AC to DC conversion efficiency of power supply 70. Regenerating power source 96 raises the overall efficiency of LED lamp 10, giving the LED lamp an efficiency close to 90 percent, i.e., close to 90% of the power consumed by the LED lamp is output as visible light.

Regenerating power supply 96 improves the efficiency at which power supply 70 provides power to LED driver 90. While the power consumption of LED light engine 24 can be modified to modify the brightness of LED lamp 10, the power consumption of LED driver 90 is approximately static. Moreover, as LEDs that operate more efficiently are developed, the power consumption of LED driver 90 is not reduced. Accordingly, when LED lamp 10 is configured or set to a lower power consumption level, the power savings due to regenerating power supply 96 has a greater effect on the overall power consumption of the LED lamp. Regenerating power supply 96 more significantly impacts the overall conversion efficiency of power supply 70 at the lower power range.

Open circuit protection 98 operates as a safety mechanism for LED lamp 10. Open circuit protection 98 includes an optocoupler that the open circuit protection turns on when the voltage difference between negative LED node 140 and positive LED node 142 (i.e., the voltage across the terminals of LED light engine 24) becomes greater than the expected voltage across the LEDs. A higher than expected voltage between negative LED node 140 and positive LED node 142 indicates a problem with LED light engine 24 is limiting current flowing through the LED light engine. When the optocoupler in open circuit protection 98 is turned on, the open circuit protection connects pins 3 and 4 of LED driver 90 to ground node 121 via an output at circuit node 124. Pins 3 and 4 of LED driver 90 set a threshold current level for when the LED driver disables current increasing through the inductor in DC power driver 92. When pin 3 or pin 4 of LED driver 90 is near ground potential, the inductor current threshold that the LED driver uses is set low. Current is enabled by LED driver 90 for only a short period, and operation of DC power driver 92 is essentially disabled. Disabling DC power driver 92 when LED light engine 24 is malfunctioning or disconnected reduces power consumption by power supply 70 attempting to power the LED light engine, and reduces the possibility of a malfunction causing further damage to LED lamp 10.

Figure 6:
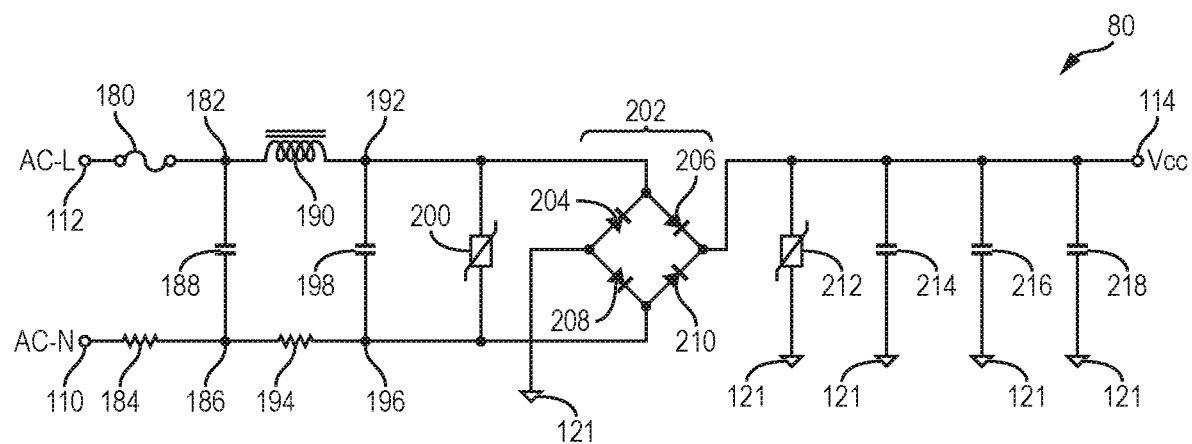
FIG. 6 is a schematic diagram of the AC rectifier for the power supply.

FIG. 6 is a schematic diagram of AC rectifier 80. AC rectifier 80 receives an AC input signal at AC neutral node 110 and AC live node 112. AC rectifier 80 outputs a pulsed DC power signal at Vcc node 114 which is approximately proportional to the AC input but with positive voltages when the AC input has negative voltages. Fuse 180 is coupled between AC live node 112 and circuit node 182. Resistor 184 is coupled between AC neutral node 110 and circuit node 186. Capacitor 188 is coupled between circuit nodes 182 and 186. Inductor 190 is coupled between circuit nodes 182 and 192. Resistor 194 is coupled between circuit nodes 186 and 196. Capacitor 198, metal-oxide varistor (MOV) 200, and full-wave rectifier 202 are coupled in parallel between circuit nodes 192 and 196. Full-wave rectifier 202 includes diode 204, diode 206, diode 208, and diode 210. The anode of diode 204 is coupled to ground node 121, and the cathode of diode 204 is coupled to circuit node 192. The anode of diode 206 is coupled to circuit node 192, and the cathode of diode 206 is coupled to Vcc node 114. The anode of diode 208 is coupled to ground node 121, and the cathode of diode 208 is coupled to circuit node 196. The anode of diode 210 is coupled to circuit node 196, and the cathode of diode 210 is coupled to Vcc node 114. MOV 212, capacitor 214, capacitor 216, and capacitor 218 are coupled in parallel between Vcc node 114 and ground node 121.

AC rectifier 80 accepts a 120 volt AC supply voltage or a 277 volt AC supply voltage connected to AC neutral node 110 and AC live node 112. External dimming mechanisms vary the magnitude of AC input to LED lamp 10, or otherwise modify the AC signal, which is coupled to AC neutral node 110 and AC live node 112. AC rectifier 80 is able to handle any AC input voltage under 277 volts and outputs a pulsed DC signal to Vcc node 114 that is approximately proportional to the AC input. The output of AC rectifier 80 on Vcc node 114 is approximately the same as the AC input when the AC input has a positive voltage, and is approximately the inverse of the AC input when the AC input has a negative voltage. Therefore, the pulsed DC on Vcc node 114 has positive voltage values and a frequency of 120 Hertz (Hz) if the input AC frequency is 60 Hz.

AC rectifier 80 accepts a DC power source as input as well as AC power sources. If LED lamp 10 is connected to a DC power source, AC rectifier 80 and the LED lamp work properly. If the input to power supply 70 is a pulsed DC signal, the signal at Vcc node 114 will be a pulsed DC signal. If the input to power supply 70 is a steady DC signal, the signal at Vcc node 114 will be a steady DC signal.

Fuse 180 is coupled to disconnect AC live node 112 from power supply 70, and provides safety in the event that a component of the power supply malfunctions resulting in a short circuit. A filament in fuse 180 melts if power supply 70 draws more current than the power supply uses under normal scenarios, effectively creating an open circuit in the fuse and cutting off AC power to the power supply. If a component of power supply 70 becomes a short circuit, the component will draw more current than intended and fuse 180 will become an open circuit, disconnecting AC live node 112 from power supply 70. Without the use of fuse 180, power supply 70 draws potentially unlimited current when a component is short circuited. Fuse 180 disconnects AC power to power supply 70 before any component of the power supply draws an unsafe amount of current.

Resistor 184, capacitor 188, inductor 190, resistor 194, and capacitor 198 form an input filter for AC rectifier 80. The input filter allows frequencies near the 50-60 Hz range, i.e., common household AC frequencies, to pass to full-wave rectifier 202 with little effect. The input filter reduces higher frequencies commonly generated by switching power supplies. The AC supply contains high frequency components generated by other devices coupled to the AC supply, which cause interference in power supply 70 if not properly filtered. The input filter also reduces high frequency signals generated by power supply 70 propagating out to the AC supply through AC neutral node 110 and AC live node 112, thus reducing interference in other devices connected to the same AC supply.

MOV 200 provides protection from power surges on the AC supply coupled to AC neutral node 110 and AC live node 112. MOV 200 exhibits a resistance that is a function of the voltage across MOV 200. When the AC voltage input from AC neutral node 110 and AC live node 112 is within the normal operating bounds of power supply 70, MOV 200 is approximately an open circuit between circuit nodes 192 and 196. When the AC voltage at AC neutral node 110 and AC live node 112 surges sufficiently above normal voltage levels, the resistance of MOV 200 reduces to divert current from AC live node 112 to AC neutral node 110 through MOV 200. MOV 200 draws enough current to lower the AC voltage between circuit nodes 192 and 196 back to a normal range for power supply 70. Without MOV 200, power surges on AC live node 112 result in a voltage on Vcc node 114 that is higher than expected. The increase in voltage on Vcc node 114 results in components of power supply 70 experiencing voltage outside of specified voltage tolerances, potentially resulting in malfunction of the power supply.

In electronic circuits, diodes generally operate as one-way valves, allowing current to flow from anode to cathode, but blocking current from cathode to anode. Diodes have a turn-on voltage, which if exceeded turns the diode on so that current flows from anode to cathode. When the anode voltage exceeds the cathode voltage by the turn-on voltage, a diode is said to be forward biased. When forward biased, the diode operates as an approximate short circuit. When the voltage at the cathode of a diode exceeds the voltage at the anode, the diode is said to be reverse biased. When reverse biased, a diode operates as an approximate open circuit.

Full-wave rectifier 202 converts the AC input power at AC neutral node 110 and AC live node 112, which alternates between positive and negative voltages, into a pulsed DC signal that has positive voltages. During the positive portion of the AC cycle, the voltage at circuit node 192 is higher than the voltage at circuit node 196. Full-wave rectifier 202 connects the higher voltage at circuit node 192 to Vcc node 114, and the lower voltage at circuit node 196 to ground node 121. Diode 206 is forward biased and allows current to flow from circuit node 192 to Vcc node 114, providing positive voltage to the Vcc node. Diode 208 is forward biased and allows current to flow from ground node 121 to the neutral AC line at AC neutral node 110, which completes the circuit between Vcc node 114 and ground node 121. Diode 204 is reverse biased and blocks the higher voltage at circuit node 192 from flowing directly to ground node 121. Diode 210 is reverse biased and blocks the positive voltage on Vcc node 114 from flowing to the neutral AC line at AC neutral node 110.

During the negative portion of the AC cycle, the voltage at circuit node 192 is lower than the voltage at circuit node 196. Circuit node 192 and circuit node 196 have switched voltage polarities, and the diodes of full-wave rectifier 202 have switched operating modes. Full-wave rectifier 202 connects the higher voltage at circuit node 196 to Vcc node 114, and the lower voltage at circuit node 192 to ground node 121. Diode 210 is forward biased and allows current to flow from circuit node 196 to Vcc node 114, providing positive voltage to the Vcc node. Diode 204 is forward biased and allows current to flow from ground node 121 to the live AC line at AC live node 112, which completes the circuit from Vcc node 114 to ground node 121. Diode 208 is reverse biased, and blocks the higher voltage at circuit node 196 from flowing directly to ground node 121. Diode 206 is reverse biased, and blocks the positive voltage on Vcc node 114 from flowing to the live AC line at AC live node 112.

Full-wave rectifier 202 operates properly if a DC signal is applied to AC neutral node 110 and AC live node 112. When a positive DC power signal is present on AC live node 112, diodes 206 and 208 remain forward biased to complete the circuit between Vcc node 114 and ground node 121, and diodes 204 and 210 are reverse biased. If a positive DC power signal is present on AC neutral node 110 relative to AC live node 112, diodes 210 and 204 are forward biased, while diodes 206 and 208 remain reverse biased.

MOV 212 serves a similar function and operates similarly to MOV 200. If the voltage on Vcc node 114 is sufficiently higher than normal for operation of power supply 70, MOV 212 connects the Vcc node to ground node 121. When Vcc node 114 is too high, MOV 200 draws enough current to ground node 121 to lower the Vcc node voltage back to within an acceptable range. Capacitors 214, 216, and 218 provide additional filtering for the power signal on Vcc node 114.

Figure 7:
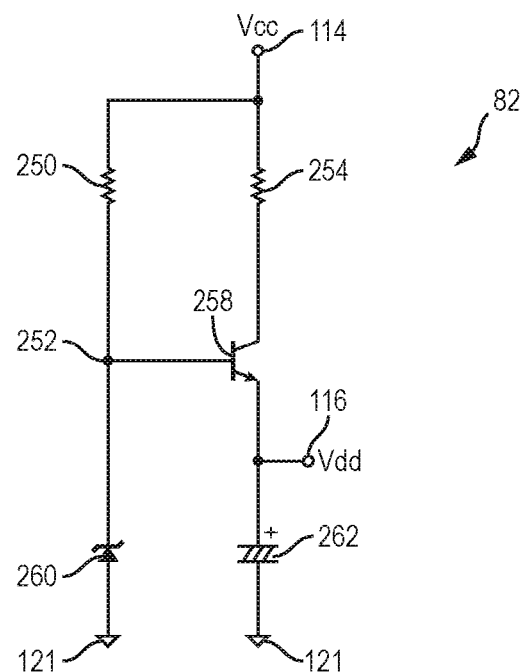
FIG. 7 is a schematic diagram of the logic power source for the power supply.

FIG. 7 is a schematic diagram of logic power source 82. Logic power source 82 has Vcc node 114 as an input, and outputs a DC voltage on Vdd node 116. Resistor 250 is coupled between Vcc node 114 and circuit node 252. Resistor 254 is coupled between Vcc node 114 and the collector of NPN bipolar junction transistor (BJT) 258. BJT 258 has a collector coupled to resistor 254, a base coupled to circuit node 252, and an emitter coupled to Vdd node 116. Zener diode 260 has an anode coupled to ground node 121 and a cathode coupled to circuit node 252. Polar capacitor 262 has a negative terminal coupled to ground node 121 and a positive terminal coupled to Vdd node 116.

Zener diodes are designed to allow current to flow from cathode to anode when a positive voltage exceeding the zener diode breakdown voltage is applied to the cathode relative to the anode. When the breakdown voltage of a zener diode is exceeded, current flows from cathode to anode. Current from cathode to anode is the reverse of normal diode operation. Zener diodes maintain the voltage difference from cathode to anode at approximately the zener diode breakdown voltage for a wide range of reverse currents, making zener diodes useful for maintaining a circuit node at a desired voltage level.

Zener diode 260 limits the voltage at circuit node 252, i.e., the base of BJT 258, to a known value. During the portion of the Vcc node 114 pulse phase when the voltage of the Vcc node is greater than the breakdown voltage of zener diode 260, the zener diode limits the voltage at circuit node 252 to the breakdown voltage. Current flows through zener diode 260 from circuit node 252 to ground node 121.

The voltage at circuit node 252 will remain at approximately the breakdown voltage of zener diode 260 as long as the voltage at Vcc node 114 is greater than the breakdown voltage. With current flowing through zener diode 260, the voltage level at circuit node 252 is approximately constant. The current through resistor 250 is dependent on the voltage at Vcc node 114 and the value of resistor 250. Specifically, the current through resistor 250 is the difference between the voltages at Vcc node 114 and circuit node 252 divided by the value of resistor 250. A portion of the current through resistor 250 supplies the base current to BJT 258, and the remainder of the current through resistor 250 flows through zener diode 260 to ground node 121. While the amplitude of the signal at Vcc node 114 varies by the use of an external dimming mechanism, the DC voltage level of Vdd node 116 remains approximately constant by the use of zener diode 260.

Bipolar junction transistors (BJTs) generally include three connection terminals. The base of a BJT is a control terminal. The emitter and collector of a BJT are conduction terminals. The base of a BJT controls current between the emitter and collector. A BJT can be a switch. The state of a BJT is either on or off when used as a switch. When an NPN BJT is turned on, current flows from the collector terminal to the emitter terminal of the BJT. Current in a PNP BJT that is turned on flows from emitter to collector. A BJT that is off blocks current flowing from collector to emitter and from emitter to collector. The state of a BJT is controlled by the BJT's base terminal. If a voltage at the base terminal of an NPN BJT is greater than a voltage at the emitter terminal by at least the NPN BJT's turn-on voltage, than the NPN BJT is turned on. If a voltage at the emitter terminal of a PNP BJT is greater than a voltage at the base terminal by at least the PNP BJT's turn-on voltage, than the PNP BJT is turned on.

BJT 258 controls the flow of current from Vcc node 114 through resistor 254 to Vdd node 116. Current flows from the collector to the emitter of BJT 258 when a positive voltage at circuit node 252 (i.e., the base of BJT 258) relative to Vdd node 116 (i.e., the emitter of BJT 258) is greater than the turn-on voltage of BJT 258. The turn-on voltage is usually about 650 millivolts for silicon BJTs at room temperature but can be different depending on the type of transistor and the biasing of the transistor.

Capacitor 262 filters the pulsed DC signal from Vcc node 114. Capacitor 262 holds a charge to limit the amount by which the voltage level of Vdd node 116 is reduced when the AC signal powering the Vdd node is below the voltage level of the Vdd node.

When LED lamp 10 is turned on for the first time, capacitor 262 is not charged and Vdd node 116 is at approximately the same voltage as ground node 121. Upon applying an AC signal to power supply 70, Vcc node 114 rises to a positive voltage. Voltage at circuit node 252 rises with Vcc node 114 up to the breakdown voltage of zener diode 260. The voltage at the base of BJT 258 (i.e., circuit node 252) is greater than the voltage at the emitter of BJT 258, which is at approximately ground potential, by more than the turn-on voltage of BJT 258. BJT 258 turns on and current flows through the BJT to Vdd node 116, charging capacitor 262. As capacitor 262 charges, the voltage level at Vdd node 116 rises to close to the breakdown voltage of zener diode 260. Vdd node 116 provides power to the logic and memory circuits of power supply 70, and LED lamp 10 is on. BJT 258 turns off when the voltage at the emitter of BJT 258 rises to close to the same voltage as circuit node 252, i.e., the zener diode breakdown voltage, because the emitter and base of 258 are at approximately the same voltage level. Once power supply 70 is on, regenerating power source 96 provides power to Vdd node 116. BJT 258 does not turn back on, and logic power source 82 does not provide power to Vdd node 116, as long as regenerating power source 96 maintains Vdd node 116 at or above the breakdown voltage of zener diode 260. BJT 258 turns back on when the voltage level at Vdd node 116 falls below the breakdown voltage of zener diode 260, and Vcc node 114 provides power to Vdd node 116 through resistor 254 and BJT 258.

Figure 8:
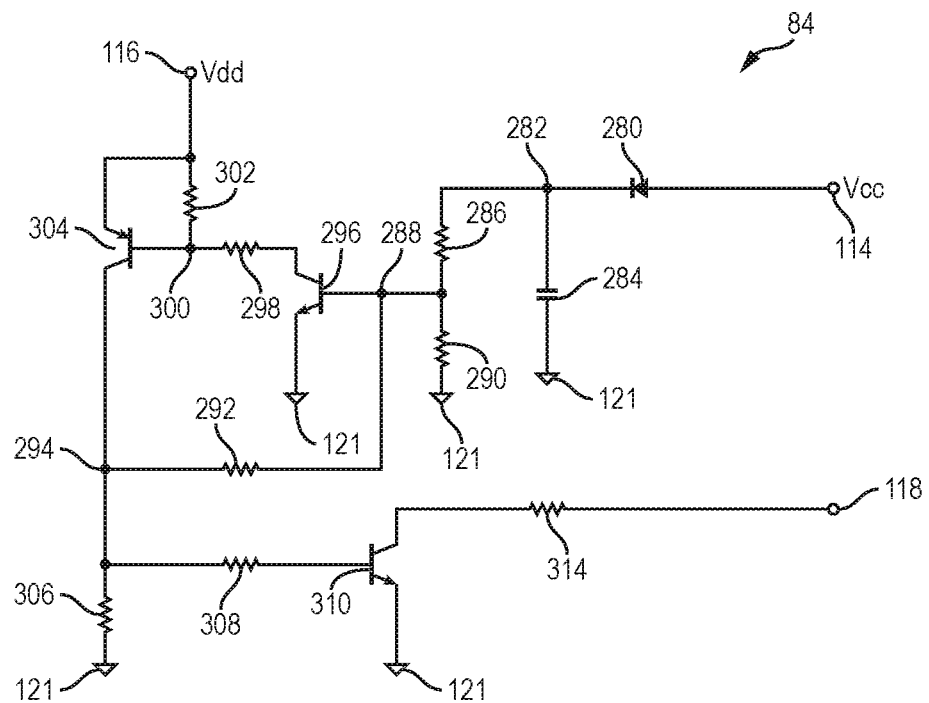
FIG. 8 is a schematic diagram of the voltage switcher for the power supply.

FIG. 8 is a schematic of voltage switcher 84. Voltage switcher 84 has Vcc node 114 and Vdd node 116 as inputs, and outputs a signal to pin 1 of LED driver 90 via circuit node 118 configuring the LED driver into either 120 volt or 277 volt mode. Diode 280 has an anode coupled to Vcc node 114 and a cathode coupled to circuit node 282. Capacitor 284 is coupled between circuit node 282 and ground node 121. Resistor 286 is coupled between circuit node 282 and circuit node 288. Resistor 290 is coupled between circuit node 288 and ground node 121. Resistor 292 is coupled between circuit node 288 and circuit node 294. NPN BJT 296 has a base coupled to circuit node 288, an emitter coupled to ground node 121, and a collector coupled to resistor 298. Resistor 298 is coupled between the collector of BJT 296 and circuit node 300. Resistor 302 is coupled between circuit node 300 and Vdd node 116. PNP BJT 304 has a base coupled to circuit node 300, an emitter coupled to Vdd node 116, and a collector coupled to circuit node 294. Resistor 306 is coupled between circuit node 294 and ground node 121. Resistor 308 is coupled between circuit node 294 and the base of NPN BJT 310. BJT 310 has a base coupled to resistor 308, an emitter coupled to ground node 121, and a collector coupled to resistor 314. Resistor 314 is coupled between the collector of BJT 310 and circuit node 118.

Diode 280 operates as a blocking diode. When the pulsed DC signal of Vcc node 114 is greater than the voltage level at circuit node 282 plus the turn-on voltage of diode 280, diode 280 is forward biased and allows current to flow to circuit node 282. When the voltage level at Vcc node 114 falls below the voltage level at circuit node 282, diode 280 is reverse biased and blocks current from flowing back out to Vcc node 114. Capacitor 284 provides filtering for the pulsed DC signal from Vcc node 114.

Bipolar junction transistors (BJTs) generally include three connection terminals. The base of a BJT is a control terminal. The emitter and collector of a BJT are conduction terminals. The base of a BJT controls current between the emitter and collector. A BJT can be a switch. The state of a BJT is either on or off when used as a switch. When an NPN BJT is turned on, current flows from the collector terminal to the emitter terminal of the BJT. Current in a PNP BJT that is turned on flows from emitter to collector. A BJT that is off blocks current flowing from collector to emitter and from emitter to collector. The state of a BJT is controlled by the BJT's base terminal. If a voltage at the base terminal of an NPN BJT is greater than a voltage at the emitter terminal by at least the NPN BJT's turn-on voltage, than the NPN BJT is turned on. If a voltage at the emitter terminal of a PNP BJT is greater than a voltage at the base terminal by at least the PNP BJT's turn-on voltage, then the PNP BJT is turned on.

Resistor 286 and resistor 290 form a voltage divider. A voltage divider is two resistors in series between two different voltage levels, which generate a third voltage level at a circuit node between the two resistors. The voltage between the two resistors is a function of the value of the two resistors. If two resistors with resistance values of R1 and R2 are coupled in series with R1 coupled to a voltage source, Vin, and R2 coupled to ground potential, the function to determine the voltage at the node between the two resistors is (R2*Vin)/(R1+R2). If the two resistors have the same value, the voltage between the two resistors will be approximately halfway between the first two voltage levels. Changing the ratio of the resistors in a voltage divider causes the voltage between the two resistors to shift. The values of resistor 286 and resistor 290 are selected so that the voltage divider generates a voltage at circuit node 288 approximately equal to the turn-on voltage of BJT 296 when the voltage at Vcc node 114 indicates the AC input to power supply 70 is 135 volts.

With BJT 296 turned off, no current flows from Vdd node 116 through resistors 302 and 298. Without current flowing through resistors 302 and 298, the resistors provide no voltage differential. Circuit node 300 and the collector of BJT 296 are at approximately the same voltage level as Vdd node 116. Therefore, the emitter of BJT 304 (Vdd node 116) is at approximately the same voltage potential as the base of BJT 304 (circuit node 300), and BJT 304 is turned off. BJT 304 blocks current flowing from Vdd node 116 to circuit node 294. The base of BJT 310 is coupled to ground node 121 via resistors 306 and 308, and does not rise above the turn-on voltage of BJT 310. BJT 310 is off, and voltage switcher 84 does not couple resistor 314 between circuit node 118 and ground node 121.

BJT 296 turns on when the input AC voltage to power supply 70 is above 135 volts AC. Current flows from the collector of BJT 296 to the emitter of BJT 296. The current through BJT 296 flows from Vdd node 116 via resistors 302 and 298, creating a voltage differential between the Vdd node, circuit node 300, and the collector of BJT 296. The collector of BJT 296 is connected to ground node 121 through BJT 296, and is at approximately ground potential. When BJT 296 is on, resistor 302 and resistor 298 form a voltage divider between Vdd node 116 and ground node 121 via BJT 296. The ratio of the values of resistor 302 and resistor 298 is selected such that when BJT 296 is turned on, the voltage potential at circuit node 300 is sufficient to turn on BJT 304.

With BJT 304 turned on, current flows from the emitter of BJT 304 (Vdd node 116) to the collector of BJT 304 (circuit node 294). The current through BJT 304 feeds back to circuit node 288 via resistor 292. The current flowing from Vdd node 116 through a turned on BJT 304, resistor 292, and to circuit node 288 creates a latch between BJT 304 and BJT 296. When the AC input to power supply 70 falls below the 135 volt threshold required to turn on BJT 296, BJT 296 remains turned on because of the current flowing from Vdd node 116 through resistor 292. If an external dimming mechanism reduces the AC input voltage below 135 volts, the latch formed between BJT 296 and BJT 304 keeps BJT 310 turned on and LED lamp 10 remains in 277 volt mode. BJT 296 keeps BJT 304 turned on via the current flowing from Vdd node 116 through resistor 302, resistor 298, and BJT 296. BJT 304 keeps BJT 296 turned on via the current flowing from Vdd node 116 through BJT 304 and resistor 292. As long as Vdd node 116 has a sufficient voltage to keep BJT 304 and BJT 296 turned on, the latch remains set and configures LED driver 90 for 277 volt mode. LED lamp 10 returns to 120 volt operating mode when the voltage level at Vdd node 116 falls to a level insufficient to keep BJT 296 and BJT 304 latched.

BJT 304 controls the state of BJT 310. When BJT 304 is off, voltage at the base of BJT 310 is below the BJT 310 turn on voltage and BJT 310 is off. When BJT 310 is off, resistor 314 is not coupled between circuit node 118 and ground node 121, and the voltage at circuit node 118 is controlled by phase angle controller 86. With BJT 304 turned on, current flows from Vdd node 116 to circuit node 294, and the voltage level at circuit node 294 is approximately the same as the voltage level at Vdd node 116. Current flows from circuit node 294 to the base of BJT 310 and turns on BJT 310. When BJT 310 is turned on, a connection is created from circuit node 118, i.e., pin 1 of LED driver 90, to ground node 121 through resistor 314. Adding resistor 314 coupled between pin 1 of LED driver 90 and ground node 121 lowers the voltage level at pin 1 to reconfigure the LED driver from 120 volt mode to 277 volt mode.

Voltage switcher 84 provides a smooth dimming for LED lamp 10 when used with a 277 volt AC supply. When a 277 volt supply line input to power supply 70 is dimmed below 120 volts, dimming occurs smoothly because LED driver 90 is retained in 277 volt mode. Power supply 70 with voltage switcher 84 is compatible with external dimmer wall packs and other sophisticated dimming systems available on the market.

Figure 9:
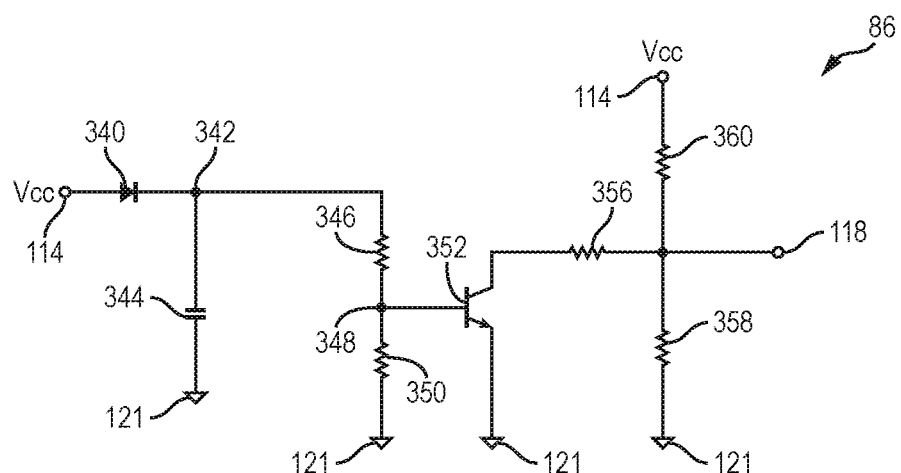
FIG. 9 is a schematic diagram of the phase angle controller for the power supply.

FIG. 9 is a schematic of phase angle controller 86. Phase angle controller 86 includes Vcc node 114 as an input. Phase angle controller 86 includes an output coupled to pin 1 of LED driver 90 via circuit node 118. Diode 340 has an anode coupled to Vcc node 114 and a cathode coupled to circuit node 342. Capacitor 344 is coupled between circuit node 342 and ground node 121. Resistor 346 is coupled between circuit node 342 and circuit node 348. Resistor 350 is coupled between circuit node 348 and ground node 121. NPN BJT 352 has a base coupled to circuit node 348, an emitter coupled to ground node 121, and a collector coupled to resistor 356. Resistor 356 is coupled between the collector of BJT 352 and circuit node 118. Resistor 358 is coupled between circuit node 118 and ground node 121. Resistor 360 is coupled between Vcc node 114 and circuit node 118.

Resistor 358 and resistor 360 form a voltage divider between Vcc node 114 and ground node 121. The voltage divider provides a signal at circuit node 118 that is approximately proportional to the signal at Vcc node 114, but at a reduced voltage level. Circuit node 118 is coupled to pin 1 of LED driver 90. Resistor 358 and resistor 360 are selected to provide a signal at circuit node 118 that is at a voltage potential acceptable as an input to LED driver 90.

Vcc node 114 carries a signal that is similar to the AC signal input on AC neutral node 110 and AC live node 112, with the Vcc node rectified to include positive voltage potentials when the AC live node includes negative voltage potentials. Therefore, the signal at circuit node 118 is similar to the AC input to power supply 70 with negative voltages rectified to positive voltages, and the voltage level reduced by the voltage divider of resistor 358 and resistor 360. Circuit node 118 is coupled to pin 1 of LED driver 90, so that pin 1 has a signal that is approximately proportional to the AC input signal of power supply 70.

Pin 1 of LED driver 90 controls the amount of current which the LED driver allows to flow through LED light engine 24. Providing a signal to pin 1 of LED driver 90 that is approximately proportional to the AC voltage input causes the LED driver to power LED light engine 24 with current that is approximately proportional to the AC input voltage. Power factor is a measurement of the phase difference between the AC supply voltage and the current used by a device. The highest power factor, 1.0, is achieved when current used by a device is perfectly in phase with the AC supply voltage. By controlling the current through LED light engine 24 with a signal that is approximately proportional to the AC supply voltage, a high power factor is achieved. Current through LED light engine 24 which is proportional to the AC supply voltage also provides dimming capability for LED lamp 10.

BJT 352 couples resistor 356 between circuit node 118 and ground node 121 in parallel with resistor 358 when BJT 352 is turned on. Diode 340 is coupled between Vcc node 114 and the base of BJT 352 to block charge from capacitor 344 from returning to Vcc node 114. Capacitor 344 filters the pulsed DC signal from Vcc node 114. Resistor 346 and resistor 350 form a voltage divider between circuit node 342 and ground node 121. The values of resistor 346 and resistor 350 are selected so that BJT 352 is turned on when the voltage input to power supply 70 is above a predetermined level. With BJT 352 turned on, and resistor 356 added in parallel with resistor 358, the voltage at circuit node 118 is reduced. In one embodiment, the values of resistors 346 and 350 are selected to turn on BJT 352 at 80 degrees of the power signal's cycle on Vcc node 116, and turn BJT 352 off at 100 degrees of the Vcc node cycle. The power signal cycle on Vcc node 116 generally starts at 0 degrees with the power signal at approximately ground potential, reaches a peak at 90 degrees, and returns to approximately ground potential at 180 degrees. Coupling resistor 356 between circuit node 118 and ground node 121 during the portion of the cycle near a peak, i.e., 80 to 100 degrees, reduces a peak of the signal at circuit node 118.

Figure 10:
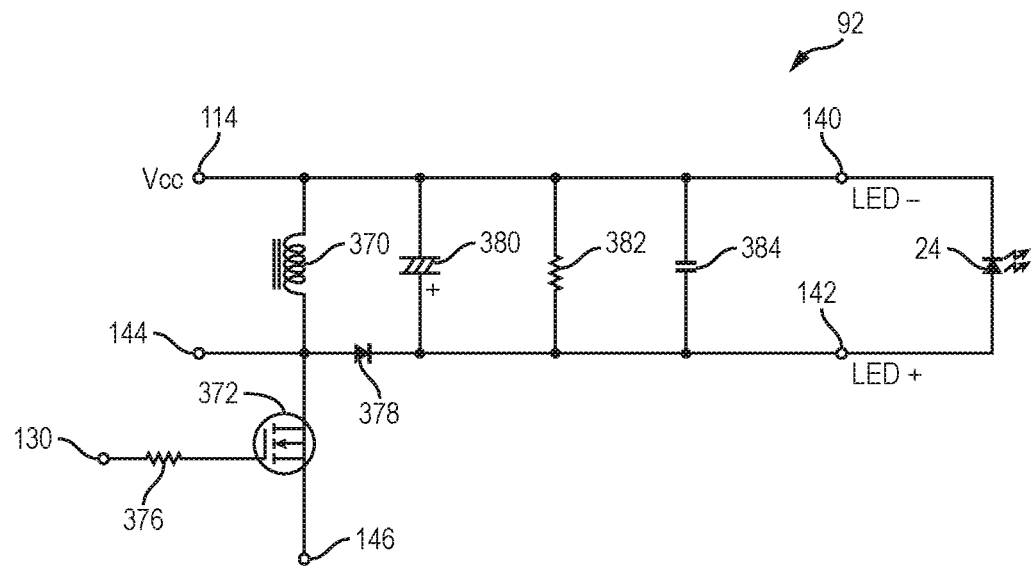
FIG. 10 is a schematic diagram of the DC power driver for the power supply.

FIG. 10 is a schematic of DC power driver 92. DC power driver 92 includes Vcc node 114 as a power input, and circuit node 130 coupled to LED driver 90 as a control input. Inductor 370 is coupled between Vcc node 114 and circuit node 144. Circuit node 144 is an output of DC power driver 92 coupled to regenerating power source 96. Metal-oxide-semiconductor field-effect transistor (MOSFET) 372 includes a drain terminal coupled to circuit node 144, a gate terminal coupled to resistor 376, and a source terminal coupled to circuit node 146. Circuit node 146 is an output of DC power driver 92 coupled to constant current controller 94. Resistor 376 is coupled between circuit node 130 and the gate of MOSFET 372. Diode 378 has an anode coupled to circuit node 144 and a cathode coupled to positive LED node 142. DC power driver 92 couples Vcc node 114 to negative LED node 140. Capacitor 380, resistor 382, and capacitor 384 are coupled in parallel between negative LED node 140 and positive LED node 142. Capacitor 380 is a polar capacitor with a negative terminal coupled to negative LED node 140 and a positive terminal coupled to positive LED node 142.

Circuit node 130 is an input to DC power driver 92 coupled to the gate of MOSFET 372 via resistor 376. Circuit node 130 is coupled to pin 7 of LED driver 90. LED driver 90 switches a voltage at circuit node 130 between on and off to control MOSFET 372. MOSFETs generally include 3 terminals. The gate of a MOSFET is a control terminal, while the drain and source are conduction terminals. A voltage on the gate of a MOSFET controls current between the drain and source. When LED driver 90 applies a voltage to the gate of MOSFET 372, a channel is created in the MOSFET allowing current to flow from circuit node 144 to circuit node 146. When MOSFET 372 is initially turned on, the current level rises from Vcc node 114, through inductor 370 and MOSFET 372, and to ground node 121 via circuit node 146 and constant current controller 94. As current through inductor 370 rises, the inductor stores energy magnetically, i.e., the inductor is charged.

When LED driver 90 detects that the current through inductor 370 has reached a threshold value, the LED driver stops supplying voltage to the gate of MOSFET 372 via pin 7 and circuit node 130. The channel through MOSFET 372 between circuit node 144 and circuit node 146 closes, and the MOSFET blocks current from flowing between circuit node 144 and circuit node 146. Current continues to flow through inductor 370, but with the path to ground node 121 through MOSFET 372 blocked. The energy stored in inductor 370 discharges to create a positive voltage at circuit node 144 relative to Vcc node 114. The positive voltage at circuit node 144 forward biases diode 378, and current flows through diode 378 to positive LED node 142. The current through diode 378 to positive LED node 142 powers LED light engine 24, and also charges capacitor 380 and capacitor 384.

LED driver 90 switches the voltage to the gate of MOSFET 372 back on after a certain period of time. The period of time LED driver 90 waits is set by resistor 122, coupled between pin 2 of the LED driver and ground node 121, which controls the internal oscillator frequency of the LED driver. The voltage at the gate of MOSFET 372 re-enables the channel through the MOSFET allowing current to flow from circuit node 144 to circuit node 146. Circuit node 144 is again coupled to ground node 121 via circuit node 146 and constant current controller 94. Current again increases from Vcc node 114, through inductor 370 and MOSFET 372, and to ground node 121 via circuit node 146 and constant current controller 94. As the current through inductor 370 rises, the inductor again stores energy magnetically.

During the period when MOSFET 372 is switched on by LED driver 90, the voltage at circuit node 144 will be at a lower voltage potential than Vcc node 114 due to the connection to ground node 121 through MOSFET 372 and constant current controller 94. Capacitors 380 and 384 retain a charge and provide current to power LED light engine 24 during the period when inductor 370 is storing energy. Current flows from Vcc node 114 to charge inductor 370. When MOSFET 372 is switched off by LED driver 90, the current through inductor 370 has no path to ground node 121 and instead discharges through diode 378 to power LED light engine 24 and charge capacitors 380 and 384.

Inductor 370 provides for a non-isolated load to power supply 70. The voltage source, i.e., Vcc node 114, and the load, i.e., LED light engine 24, are connected to a single coil of inductor 370. When MOSFET 372 is turned on, the single coil of inductor 370 stores energy magnetically. When MOSFET 372 is turned off, the single coil of inductor 370 discharges the stored energy through LED light engine 24. A non-isolated load enables a cheaper and more compact power supply 70 because a smaller inductor 370 with a single coil is used, and fewer components are required. The non-isolated load also improves conversion efficiency from AC power to DC power.

Figure 11A:
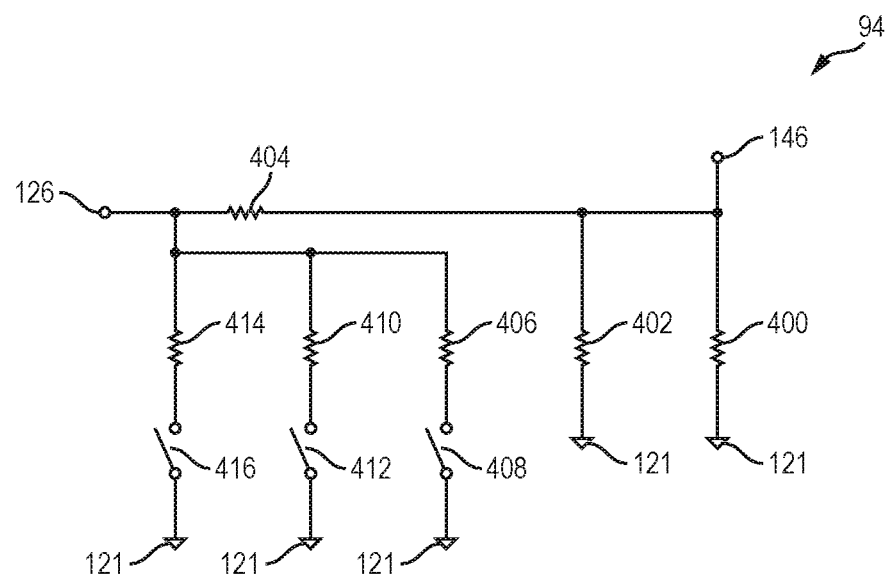
FIGS. 11a-11b are schematic diagrams of the constant current controller for the power supply.

FIG. 11a is a schematic of constant current controller 94 with manual power setting. Circuit node 146 is an input to constant current controller 94 from DC power driver 92. Circuit node 126 is an output of constant current controller 94 to pin 5 of LED driver 90. Resistor 400 and resistor 402 are coupled in parallel between circuit node 146 and ground node 121. Resistor 404 is coupled between circuit node 146 and circuit node 126. Resistor 406 and switch 408 are connected in series between circuit node 126 and ground node 121. Resistor 410 and switch 412 are connected in series between circuit node 126 and ground node 121. Resistor 414 and switch 416 are connected in series between circuit node 126 and ground node 121.

Constant current controller 94 provides a configurable path to ground node 121 for current flowing through inductor 370 in DC power driver 92. As current flows through constant current controller 94 from circuit node 146 to ground node 121, a differential voltage is observed at circuit node 126. Circuit node 126 is coupled to pin 5 of LED driver 90, and used by the LED driver to sense the current through inductor 370. Constant current controller 94 is configurable to control the resistance between circuit node 126 and ground node 121. The effective resistance of constant current controller 94 determines the ratio of current through the constant current controller and voltage at circuit node 126. Because LED driver 90 shuts off voltage to MOSFET 372 in DC power driver 92 when the voltage at circuit node 126 reaches a threshold, modifying the resistor network of constant current controller 94 changes the current through inductor 370 at which the voltage threshold is reached. The peak current through inductor 370 controls the current through LED light engine 24, and the total power output of LED lamp 10.

Switches 408, 412, and 416 are DIP switches or a jumper array mounted on circuit board 72. While three switches are illustrated, any number of switches can be used to provide the desired number of power settings for LED lamp 10. Switches 408, 412, and 416 configure the resistor network of constant current controller 94. Switch 408 controls whether resistor 406 is coupled between circuit node 126 and ground node 121. Switch 412 controls whether resistor 410 is coupled between circuit node 126 and ground node 121. Switch 416 controls whether resistor 414 is coupled between circuit node 126 and ground node 121. Resistors 406, 410, and 414 are coupled between circuit node 126 and ground node 121 by switches 408, 412, and 416 individually, or in any combination in parallel, to provide the required resistance for the desired power mode of LED lamp 10.

Different modalities of selecting resistance values for resistors 406, 410, and 414 exist. In one modality, resistors 406, 410, and 414 are the same resistance value so that the power setting of LED lamp 10 is controlled by the number of resistors coupled in parallel between circuit node 126 and ground node 121. In a second modality, the values of resistors 406, 410, and 414 are selected so that each resistor corresponds to a calculated resistance required for a desired power setting. Only one of resistors 406, 410, and 414 is coupled between circuit node 126 and ground node 121 to enable the associated power setting. In a third modality, three different values are selected for resistors 406, 410, and 414. Resistors 406, 410, and 414 are enabled in any combination to provide eight different power settings. The number of power settings possible is controlled by the number of switches and resistors used. For N switches and N resistors, $2^N$ different power settings are possible.

Figure 11B:
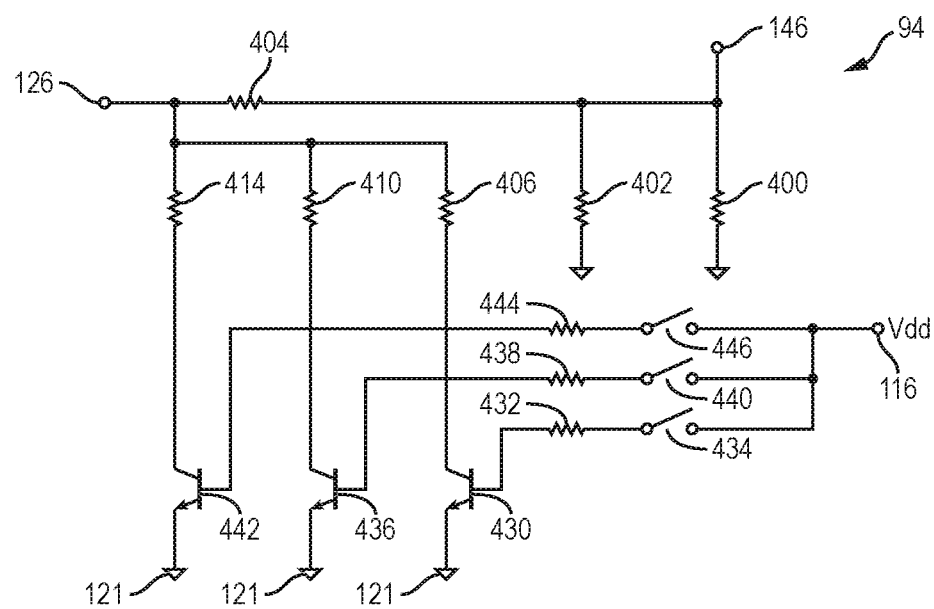

FIG. 11b is a schematic of constant current controller 94 with active power setting. Switch 408 is replaced by NPN BJT 430, which is controlled via resistor 432 and switch 434 connected in series between Vdd node 116 and the base of BJT 430. Switch 412 is replaced by NPN BJT 436, which is controlled via resistor 438 and switch 440 connected in series between Vdd node 116 and the base of BJT 436. Switch 416 is replaced by NPN BJT 442, which is controlled via resistor 444 and switch 446 connected in series between Vdd node 116 and the base of BJT 442.

Switches 434, 440, and 446 are any mechanism for controlling whether the voltage of Vdd node 116 is routed to the bases of BJTs 430, 436, and 442, respectively. In one embodiment, switches 434, 440, and 446 are output terminals on an integrated circuit powered by Vdd node 116. When an output terminal of the integrated circuit is a logic '1', a positive voltage exists on the output and is coupled to a base of BJT 430, 436, or 442 to turn on the respective BJT. When the output terminal of the integrated circuit is a logic '0', no voltage exists on the output and the respective BJT 430, 436, or 442 is turned off. The integrated circuit uses multiple output pins to individually control resistors 406, 410, and 414 so that the resistors are coupled between circuit node 126 and ground node 121 in any combination.

The outputs of the integrated circuit, represented by switches 434, 440, and 446, are controlled by an infrared receiver coupled to an input of the integrated circuit. A user of LED lamp 10 controls the power setting of the LED lamp using a remote control which sends an infrared signal to communicate how resistors 406, 410, and 414 are to be connected between circuit node 126 and ground node 121. The infrared receiver converts the infrared signal into an electric signal to the integrated circuit, and the integrated circuit switches the signals to BJTs 430, 436, and 442 accordingly. In another embodiment, LED lamp 10 connects to a Wi-Fi network, and a user of the LED lamp controls the power setting via a web interface or phone app.

Figure 12A:
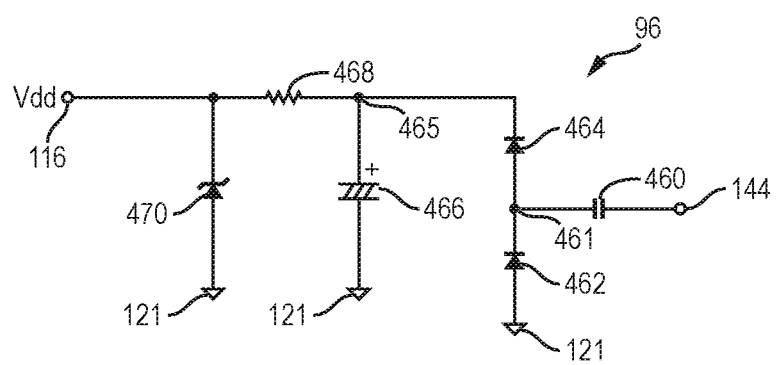
FIGS. 12a-12b are schematic diagrams of the regenerating power source for the power supply.

FIG. 12a is a schematic of a first embodiment of regenerating power source 96. Regenerating power source 96 as shown in FIG. 12a is the preferred embodiment when the turn-on voltage of LED light engine 24 is less than 70 volts DC. Regenerating power source 96 receives a high frequency power signal on circuit node 144 as an input and outputs a DC power signal on Vdd port 116. Capacitor 460 is coupled between circuit node 144 and circuit node 461. Diode 462 has an anode coupled to ground node 121 and a cathode coupled to circuit node 461. Diode 464 has an anode coupled to circuit node 461 and a cathode coupled to circuit node 465. Polar capacitor 466 has a negative terminal coupled to ground node 121 and a positive terminal coupled to circuit node 465. Resistor 468 is coupled between circuit node 465 and Vdd node 116. Zener diode 470 has an anode coupled to ground node 121 and a cathode coupled to Vdd node 116.

The signal on circuit node 144 is coupled from DC power driver 92. Circuit node 144 is at a lower voltage level than Vcc node 114 when MOSFET 372 of DC power driver 92 is on and inductor 370 is storing energy. Circuit node 144 is at a higher voltage level than Vcc node 114 when MOSFET 372 is off and inductor 370 is discharging to LED light engine 24. The rapid switching between MOSFET 372 being on and MOSFET 372 being off creates the high frequency power signal on circuit node 144.

Capacitor 460 operates as a coupling capacitor between circuit node 144 and circuit node 461. Capacitor 460 passes the AC component of the signal on circuit node 144 to circuit node 461 while isolating regenerating power source 96 from a DC offset of circuit node 144.

Diode 462 operates as a clamping diode. If the AC signal at circuit node 461 is at a voltage level below ground node 121, diode 462 allows capacitor 460 to charge back up to ground potential via a connection to ground node 121. Capacitor 460 charging via diode 462 shifts the signal at circuit node 461 to ground potential. As the signal at circuit node 461 rises with the signal at circuit node 144, circuit node 461 rises beginning from ground potential. Thus, diode 462 shifts the AC signal at circuit node 461 to include a minimum voltage at approximately ground potential.

Diode 464 operates to rectify the high frequency signal at circuit node 461. During the portion of the cycle when the voltage level at circuit node 461 is greater than the voltage level at circuit node 465, current flows through diode 464 to provide Vdd node 116 with power. During the portion of the cycle when the voltage level at circuit node 461 is lower than the voltage level at circuit node 465, diode 464 blocks current from flowing back to circuit node 461.

Capacitor 466 filters the signal at circuit node 465. When the signal at circuit node 461 is near a peak, capacitor 466 is charged by current flowing through diode 464. When the signal at circuit node 461 returns to a voltage closer to ground potential, the charge of capacitor 466 retains circuit node 465 at a voltage level close to the peak of the signal. Diode 464 blocks current from flowing back to circuit node 461, which is at a lower voltage. Capacitor 466 reduces the amount of AC component in the signal at circuit node 465 to provide a steadier DC voltage to Vdd node 116.

Zener diodes are designed to allow current to flow from cathode to anode when a positive voltage exceeding the zener diode breakdown voltage is applied to the cathode relative to the anode. When the breakdown voltage of a zener diode is exceeded, current flows from the cathode to the anode of the zener diode. Current flowing from cathode to anode is the reverse of typical diode current. Zener diodes maintain the voltage difference from cathode to anode at approximately the zener diode breakdown voltage for a wide range of reverse currents, making zener diodes useful for maintaining a circuit node at a desired voltage level.

Zener diode 470 regulates the voltage at Vdd node 116. Zener diode 470 limits the voltage at Vdd node 116 to a voltage usable to power the logic and memory components of power supply 70. Zener diode 470 allows current to flow from Vdd node 116 to ground node 121 to keep Vdd node 116 near a desired voltage level. The cathode of zener diode 470 is coupled to circuit node 465 via resistor 468. Vdd node 116 is limited by zener diode 470 while circuit node 465 is limited by the magnitude of the input AC signal on circuit node 144. Resistor 468 provides for a transition between the voltage levels of circuit node 465 and Vdd node 116, and reduces the amount of current that flows through zener diode 470 to ground node 121.

When the input signal to regenerating power source 96 at circuit node 144 is of sufficient amplitude so that the voltage at circuit node 465 is greater than or equal to the zener diode breakdown voltage, the regenerating power source is active and providing power to Vdd node 116. The emitter of BJT 258 in logic power source 82 is coupled to Vdd node 116 and is at the breakdown voltage of zener diode 470. If zener diode 260 in logic power source 82 has the same breakdown voltage as zener diode 470, than BJT 258 in the logic power source is off because the base and emitter of BJT 258 are at approximately the same voltage potential. As long as regenerating power source 96 keeps Vdd node 116 at the zener breakdown voltage, BJT 258 in logic power source 82 is off. Logic power source 82 decouples Vdd node 116 from being supplied directly by Vcc node 114 through the logic power source.

The high frequency signal at circuit node 144 is converted to a DC signal on Vdd node 116 more efficiently than the lower frequency AC signal input at AC neutral node 110 and AC live node 112. Regenerating power source 96 provides a secondary power tapped from inductor 370 to provide power to LED driver 90 with lower power consumption, which boosts the overall AC to DC conversion efficiency of power supply 70. Therefore, providing power to Vdd node 116 from regenerating power source 96 and disconnecting logic power source 82 when possible is advantageous. Using a non-isolated load, with an inductor having a single coil, and configuring power supply 70 so that negative LED node 140 is electrically coupled to the voltage source for the coil, i.e., Vcc node 114, provides for a signal at circuit node 144 that has a higher amplitude than in other configurations. When MOSFET 372 is on, circuit node 144 is coupled to ground node 121 and at a lower voltage potential than Vcc node 114. When MOSFET 372 is off, circuit node 144 is not coupled to ground node 121 and is at a higher voltage potential than Vcc node 114.

Figure 12B:
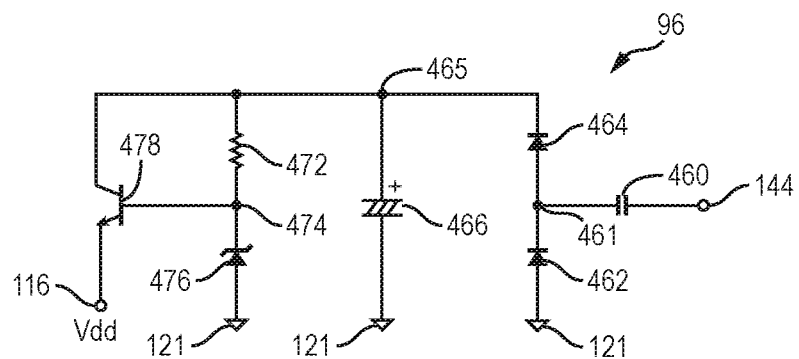

FIG. 12b is a schematic of a second embodiment of regenerating power source 96. Regenerating power source 96 as shown in FIG. 12b is the preferred embodiment when the turn-on voltage of LED light engine 24 is greater than 70 volts DC. Regenerating power source 96 receives a high frequency power signal on circuit node 144 as an input and outputs a DC power signal on Vdd port 116. Capacitor 460 is coupled between circuit node 144 and circuit node 461. Diode 462 has an anode coupled to ground node 121 and a cathode coupled to circuit node 461. Diode 464 has an anode coupled to circuit node 461 and a cathode coupled to circuit node 465. Polar capacitor 466 has a negative terminal coupled to ground node 121 and a positive terminal coupled to circuit node 465. Resistor 472 is coupled between circuit node 465 and circuit node 474. Zener diode 476 has an anode coupled to ground node 121 and a cathode coupled to circuit node 474. NPN BJT 478 has a collector coupled to circuit node 465, a base coupled to circuit node 474, and an emitter coupled to Vdd node 116.

The signal on circuit node 144 is coupled from DC power driver 92. Circuit node 144 is at a lower voltage level than Vcc node 114 when MOSFET 372 of DC power driver 92 is on and inductor 370 is storing energy. Circuit node 144 is at a higher voltage level than Vcc node 114 when MOSFET 372 is off and inductor 370 is discharging to LED light engine 24. The rapid switching between MOSFET 372 being on and MOSFET 372 being off creates the high frequency power signal on circuit node 144.

Capacitor 460 operates as a coupling capacitor between circuit node 144 and circuit node 461. Capacitor 460 passes the AC component of the signal on circuit node 144 to circuit node 461 while isolating regenerating power source 96 from a DC offset of circuit node 144.

Diode 462 operates as a clamping diode. If the AC signal at circuit node 461 is at a voltage level below ground node 121, diode 462 allows capacitor 460 to charge back up to ground potential via a connection to ground node 121. Capacitor 460 charging via diode 462 shifts the signal at circuit node 461 to ground potential. As the signal at circuit node 461 rises with the signal at circuit node 144, circuit node 461 rises beginning from ground potential. Thus, diode 462 shifts the AC signal at circuit node 461 to include a minimum voltage at approximately ground potential.

Diode 464 operates to rectify the high frequency signal at circuit node 461. During the portion of the cycle when the voltage level at circuit node 461 is greater than the voltage level at circuit node 465, current flows through diode 464 to provide Vdd node 116 with power. During the portion of the cycle when the voltage level at circuit node 461 is lower than the voltage level at circuit node 465, diode 464 blocks current from flowing back to circuit node 461.

Capacitor 466 filters the signal at circuit node 465. When the signal at circuit node 461 is near a peak, capacitor 466 is charged by current flowing through diode 464. When the signal at circuit node 461 returns to a voltage closer to ground potential, the charge of capacitor 466 retains circuit node 465 at a voltage level close to the peak of the signal. Diode 464 blocks current from flowing back to circuit node 461, which is at a lower voltage. Capacitor 466 reduces the amount of AC component in the signal at circuit node 465 to provide a steadier DC voltage to Vdd node 116.

Zener diodes are designed to allow current to flow from cathode to anode when a positive voltage exceeding the zener diode breakdown voltage is applied to the cathode relative to the anode. When the breakdown voltage of a zener diode is exceeded, current flows from the cathode to the anode of the zener diode. Current flowing from cathode to anode is the reverse of typical diode current. Zener diodes maintain the voltage difference from cathode to anode at approximately the zener diode breakdown voltage for a wide range of reverse currents, making zener diodes useful for maintaining a circuit node at a desired voltage level.

Zener diode 476 operates similarly to zener diode 470 of FIG. 12a, but is used differently. Zener diode 470 has a cathode coupled to Vdd node 116 to directly regulate the voltage on the Vdd node. Zener diode 476 has a cathode coupled to the base of BJT 478, and indirectly regulates the voltage at Vdd node 116 by controlling current from circuit node 465 to Vdd node 116. Zener diode 476 limits the voltage at circuit node 474, i.e., the base of BJT 478, to the breakdown voltage of zener diode 476 by allowing current to flow from circuit node 474 to ground node 121 when the voltage at circuit node 474 rises above the zener diode 476 breakdown voltage.

Resistor 472 operates similarly to resistor 468 in FIG. 12a. Both resistor 472 and resistor 468 are used to limit the current to ground node 121 through zener diodes 476 and 470, respectively. The configuration of resistor 472 in FIG. 12b is different than FIG. 12a because it removes resistor 468 in the path of current from circuit node 144 to Vdd node 116. Due to resistor 472 not being in the path of current to Vdd node 116, a larger resistor 472 is used compared to resistor 468. A larger resistor 472 reduces the amount of current through zener diode 472 to ground node 121.

BJT 478 operates as a switch, allowing current to flow from circuit node 465 to Vdd node 116 when the Vdd node is below the zener diode 476 breakdown voltage and circuit node 465 is above the zener diode 476 breakdown voltage. When circuit node 465 is above the breakdown voltage of zener diode 476, current flows from circuit node 465, through resistor 472 and zener diode 476, to ground node 121. Zener diode 476 maintains circuit node 474 at approximately the breakdown voltage of zener diode 476. If Vdd node 116 is below the zener breakdown voltage, than a positive voltage exists at circuit node 474, i.e., the base of BJT 478, relative to Vdd node 116, i.e., the emitter of BJT 478, which turns on BJT 478. With BJT 478 turned on, current flows from circuit node 465 to Vdd node 116 to raise the voltage at the Vdd node. Once Vdd node 116 rises to near the zener diode 476 breakdown voltage, a positive voltage will no longer exist at the base of BJT 478 relative to the emitter of BJT 478. BJT 478 turns off, and Vdd node 116 is prevented from rising above the zener diode 476 breakdown voltage even if circuit node 465 is higher. Vdd node 116 is regulated at approximately the zener diode 476 breakdown voltage by the operation of resistor 472, zener diode 476, and BJT 478 controlling current from circuit node 465 to Vdd node 116.

The high frequency signal at circuit node 144 is converted to a DC signal on Vdd node 116 more efficiently than the lower frequency AC signal input at AC neutral node 110 and AC live node 112. Regenerating power source 96 provides a secondary power tapped from inductor 370 to provide power to LED driver 90 with lower power consumption, which boosts the overall AC to DC conversion efficiency of power supply 70. Therefore, providing power to Vdd node 116 from regenerating power source 96 and disconnecting logic power source 82 when possible is advantageous. Using a non-isolated load, with an inductor having a single coil, and configuring power supply 70 so that negative LED node 140 is electrically coupled to the voltage source for the coil, i.e., Vcc node 114, provides for a signal at circuit node 144 that has a higher amplitude than in other configurations. When MOSFET 372 is on, circuit node 144 is coupled to ground node 121 and at a lower voltage potential than Vcc node 114. When MOSFET 372 is off, circuit node 144 is not coupled to ground node 121 and is at a higher voltage potential than Vcc node 114.

Regenerating power source 96 provides a higher efficiency power source for LED driver 90. In scenarios where LED light engine 24 uses less power, LED driver 90 consumes a higher percentage of the total power consumption of LED lamp 10. Thus, regenerating power source 96 has a larger benefit to the overall power efficiency in lower power uses.

Figure 13:
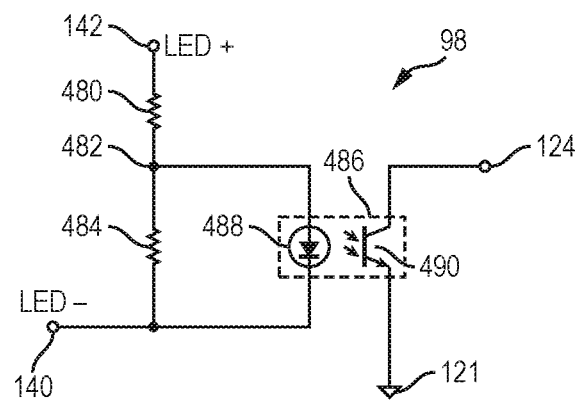
FIG. 13 is a schematic diagram of the open circuit protection for the power supply.

FIG. 13 is a schematic of open circuit protection 98. Open circuit protection 98 has negative LED node 140 and positive LED node 142 as inputs, and an output at circuit node 124 coupled to pins 3 and 4 of LED driver 90. Resistor 480 is coupled between positive LED node 142 and circuit node 482. Resistor 484 is coupled between circuit node 482 and negative LED node 140. Optocoupler 486 includes LED 488 and phototransistor 490. LED 488 has an anode coupled to circuit node 482 and a cathode coupled to negative LED node 140. Phototransistor 490 has a collector coupled to circuit node 124 and an emitter coupled to ground node 121.

Resistor 480 and resistor 484 form a voltage divider between positive LED node 142 and negative LED node 140. The values of resistors 480 and 484 are selected such that the voltage difference between negative LED node 140 and circuit node 482 is greater than the turn-on voltage of LED 488 if the voltage between negative LED node 140 and positive LED node 142 is greater than the turn-on voltage of LED light engine 24. The voltage difference between negative LED node 140 and positive LED node 142 has a known value under normal operation, i.e., the turn-on voltage of LED light engine 24. A voltage above the turn-on voltage of LED light engine 24 between negative LED node 140 and positive LED node 142 indicates to open circuit protection 98 that there is a problem with the LED light engine, and the open circuit protection disables LED driver 90 by coupling pins 3 and 4 of the LED driver to ground node 121.

An abnormal voltage difference between negative LED node 140 and circuit node 482 turns on LED 488. LED 488 emits photons in the form of near infrared light. LED 488 and phototransistor 490 are packaged together in close proximity, so that the photons emitted by LED 488 hit the phototransistor. Photons hitting the base-collector junction of phototransistor 490 turn on the phototransistor. When phototransistor 490 is turned on, current flows from circuit node 124 (connected to pins 3 and 4 of LED driver 90) to ground node 121. With pins 3 and 4 of LED driver 90 at a voltage potential near ground node 121, LED driver 90 reduces the on-time of the signal to MOSFET 372 of DC power driver 92. Current through the DC power driver is effectively limited.

While one or more embodiments of the present invention have been illustrated in detail, the skilled artisan will appreciate that modifications and adaptations to the embodiments may be made without departing from the scope of the present invention as set forth in the following claims.

What is claimed:

1. A light-emitting diode (LED) lighting device, comprising:
   an LED; and
   a power supply including,
      (a) a controller,
      (b) a power input terminal,
      (c) a voltage switcher coupled between the power input terminal and a first terminal of the controller and including a latch with an output of the latch coupled to the first terminal of the controller, wherein the voltage switcher includes a logic power input configured to maintain a state of the latch when a voltage potential of the power input terminal is reduced below a latching threshold,
      (d) a phase angle controller coupled between the power input terminal and the first terminal of the controller in parallel with the voltage switcher,
      (e) an inductor coupled to the LED, and
      (f) a regenerating power source coupled between the inductor and a second terminal of the controller.

2. The LED lighting device of claim 1, wherein the voltage switcher further includes a voltage divider coupled between the latch and the power input terminal.

3. The LED lighting device of claim 1, wherein the phase angle controller includes a voltage divider.

4. The LED lighting device of claim 1, further including a rectifier coupled between the power input terminal of the LED lighting device and the second terminal of the controller.

5. The LED lighting device of claim 1, wherein a cathode of the LED is coupled to the power input terminal of the LED lighting device.

6. A circuit for providing a power signal, comprising:
   a controller;
   a power input terminal;
   a voltage switcher coupled between the power input terminal and a first terminal of the controller;
   a phase angle controller coupled between the power input terminal and the first terminal of the controller in parallel with the voltage switcher;
   a logic power source coupled to a second terminal of the controller;
   a regenerating power source coupled to the second terminal of the controller; and
   an inductor comprising a first terminal of the inductor coupled to the power input terminal of the circuit and a second terminal of the inductor coupled to the regenerating power source.

7. The circuit of claim 6, wherein the voltage switcher includes a latch.

8. The circuit of claim 7, wherein the voltage switcher further includes a voltage divider coupled between the latch and the power input terminal.

9. The circuit of claim 7, wherein the latch includes a first transistor and a second transistor, and an output of the regenerating power source is electrically coupled between the first transistor and second transistor.

10. The circuit of claim 6, wherein the phase angle controller includes a voltage divider coupled between the power input terminal and the first terminal of the controller.

11. The circuit of claim 6, wherein the regenerating power source includes:
   a capacitor; and
   a diode, wherein the power input terminal of the circuit is coupled to the second terminal of the controller through the capacitor, diode, and inductor in series.

12. A circuit for providing a power signal, comprising: a controller; a power input terminal; a voltage switcher coupled between the power input terminal and a terminal of the controller, wherein the voltage switcher includes latch comprising a plurality of transistors; and a phase angle controller coupled between the power input terminal and the terminal of the controller in parallel with the voltage switcher; wherein the phase angle controller includes a first voltage divider coupled between the power input terminal and the terminal of the controller; wherein the phase angle controller further includes: a second voltage divider; and a transistor coupled between the first voltage divider and second voltage divider.

13. The circuit of claim 12, wherein the voltage switcher is configured to maintain a state of the latch when a voltage potential of the power input terminal is reduced below a latching threshold.

14. The circuit of claim 12, wherein the voltage switcher further includes a voltage divider coupled between the latch and power input terminal.

15. The circuit of claim 12, wherein the voltage switcher further includes a transistor coupled between the latch and the terminal of the controller.

16. A method of providing a power signal, comprising: providing a controller; coupling a latch between a power input terminal and a first terminal of the controller, wherein the latch includes a plurality of first transistors; and coupling a voltage divider between the power input terminal and the first terminal of the controller, wherein the voltage divider is configured to provide a first voltage to an input of the latch that is proportional with a second voltage at the power input terminal; providing a capacitor; providing a diode; and coupling an inductor to a second terminal of the controller through the capacitor and diode in series; coupling a rectifier to the second terminal of the controller; wherein the power input terminal is coupled to the second terminal of the controller through the rectifier in parallel with the capacitor, diode, and inductor.

17. The method of claim 16, further including coupling a second transistor between the latch and the first terminal of the controller.

18. The method of claim 16, further including coupling a second transistor between the voltage divider and a ground node.

19. The method of claim 16, further including providing a logic power input configured to maintain a state of the latch when a voltage potential of the power input terminal is reduced below a latching threshold.

\* \* \* \* \*